US012646059B2

(12) United States Patent
Jones et al.

(10) Patent No.: US 12,646,059 B2
(45) Date of Patent: Jun. 2, 2026

(54) REAL-TIME PROVISIONING OF TARGETED DIGITAL CONTENT BASED ON DECOMPOSED STRUCTURED MESSAGING DATA AND PEER DATA

(71) Applicant: The Toronto-Dominion Bank, Toronto (CA)

(72) Inventors: Christopher Mark Jones, Villanova, PA (US); Barry Wayne Baird, Jr., Kennett Square, PA (US); Claude Bernell Lawrence, Jr., Philadelphia, PA (US); Jonathan Joseph Prendergast, West Chester, PA (US)

(73) Assignee: The Toronto-Dominion Bank, Toronto (CA)

( * ) Notice: Subject to any disclaimer, the term of this patent is extended or adjusted under 35 U.S.C. 154(b) by 3 days.

(21) Appl. No.: 17/824,238

(22) Filed: May 25, 2022

(65) Prior Publication Data

US 2022/0383301 A1    Dec. 1, 2022

Related U.S. Application Data

(60) Provisional application No. 63/194,757, filed on May 28, 2021.

(51) Int. Cl.
G06Q 20/02        (2012.01)
G06Q 20/14        (2012.01)
(Continued)

(52) U.S. Cl.
CPC ........... G06Q 20/386 (2020.05); G06Q 20/02 (2013.01)

(58) Field of Classification Search
None
See application file for complete search history.

(56) References Cited

U.S. PATENT DOCUMENTS 6,029,150 A      2/2000  Kravitz
6,098,053 A  *   8/2000  Slater ................... G06Q 20/204
                                                      705/35
(Continued)

FOREIGN PATENT DOCUMENTS

AU        2013206122        7/2014
CA         3014693 A1      2/2020
(Continued)

OTHER PUBLICATIONS

Joris Lochy, "Big Data in the Financial Services Industry—From data to insights," Finextra, Sep. 9, 2019 (12 pages).
(Continued)

*Primary Examiner* — Matthew S Gart
*Assistant Examiner* — Tony P Kanaan
(74) *Attorney, Agent, or Firm* — Nixon Peabody LLP

(57)          ABSTRACT

Computer-implemented systems and processes may provision, in real-time, targeted, event-specific digital content based on decomposed, structured message data and peer data. For example, an apparatus receives a message associated with an exchange of data involving a first counterparty and a second counterparty. The message may include elements of message data characterizing a real-time payment from the second counterparty to the first counterparty. Based on elements of message data, the apparatus may determine a value of at least one parameter characterizing the first counterparty and use a trained machine-learning or artificial-intelligence process, and may obtain elements of peer data consistent with at least one parameter value. The apparatus may transmit notification data including digital content associated with at least one of the elements of peer data or the at least one parameter value to a device operable by the first counterparty, which may present the digital content within a digital interface.

24 Claims, 8 Drawing Sheets

(51) Int. Cl.

| | |
|---|---|
| G06Q 20/28 | (2012.01) |
| G06Q 20/38 | (2012.01) |
| G06Q 30/0207 | (2023.01) |

(56) References Cited

U.S. PATENT DOCUMENTS

| | | | |
|---|---|---|---|
| 7,184,989 | B2 | 2/2007 | Hansen et al. |
| 7,366,694 | B2 | 4/2008 | Lazerson |
| 7,487,112 | B2 | 2/2009 | Barnes, Jr. |
| 7,555,459 | B2 | 6/2009 | Dhar et al. |
| 7,593,889 | B2 | 9/2009 | Raines et al. |
| 7,624,070 | B2 | 11/2009 | Lebouitz |
| 7,630,933 | B2 | 12/2009 | Peterson et al. |
| 7,653,592 | B1 | 1/2010 | Flaxman et al. |
| 7,676,425 | B1 | 3/2010 | Noles |
| 7,676,431 | B2 | 3/2010 | O'Leary et al. |
| 7,680,737 | B2 | 3/2010 | Smith, Jr. et al. |
| 7,693,790 | B2 | 4/2010 | Lawlor et al. |
| 7,707,055 | B2 | 4/2010 | Behmoiras et al. |
| 7,707,107 | B2 | 4/2010 | Gebb et al. |
| 7,801,778 | B2 | 9/2010 | Fox |
| 7,809,633 | B2 | 10/2010 | Nolan, III et al. |
| 7,813,965 | B1 | 10/2010 | Robinson et al. |
| 7,827,052 | B2 | 11/2010 | Scott et al. |
| 7,844,546 | B2 | 11/2010 | Fleishman et al. |
| 7,849,003 | B2 | 12/2010 | Egnatios et al. |
| 7,873,543 | B2 | 1/2011 | Ferrier et al. |
| 7,899,712 | B2 | 3/2011 | May et al. |
| 7,904,306 | B2 | 3/2011 | Johnson et al. |
| 7,912,784 | B2 | 3/2011 | Sobek |
| 7,970,669 | B1 | 6/2011 | Santos |
| 8,156,022 | B2 | 4/2012 | Fell et al. |
| 8,249,983 | B2 | 8/2012 | Dilip et al. |
| 8,423,403 | B2 | 4/2013 | McClung |
| 8,433,648 | B2 | 4/2013 | Keithley et al. |
| 8,600,798 | B1 | 12/2013 | Corr et al. |
| 8,606,705 | B2 | 12/2013 | Zanzot et al. |
| 8,612,339 | B2 | 12/2013 | Rose et al. |
| 8,615,426 | B2 | 12/2013 | Carlson |
| 8,639,910 | B2 | 1/2014 | Karamcheti et al. |
| 8,666,812 | B1 | 3/2014 | Gandhi |
| 8,700,484 | B2 | 4/2014 | Senior |
| 8,712,912 | B2 | 4/2014 | Carlson et al. |
| 8,719,071 | B2 | 5/2014 | MacIntyre et al. |
| 8,732,044 | B2 | 5/2014 | Lovelett et al. |
| 8,744,899 | B2 | 6/2014 | Rose et al. |
| 8,751,387 | B2 | 6/2014 | Hougland et al. |
| 8,756,099 | B2 | 6/2014 | Keithley et al. |
| 8,788,416 | B1 | 7/2014 | Vu |
| 8,799,150 | B2 | 8/2014 | Annappindi |
| 8,814,039 | B2 | 8/2014 | Bishop et al. |
| 9,094,512 | B2 | 7/2015 | Sheldon et al. |
| 9,218,618 | B2 | 12/2015 | Walker et al. |
| 9,390,410 | B2 | 7/2016 | Casares |
| 9,412,118 | B2 | 8/2016 | Loomis |
| 9,563,915 | B2 | 2/2017 | Brady et al. |
| 9,600,839 | B2 | 3/2017 | Calman et al. |
| 9,792,600 | B1 | 10/2017 | Grassadonia |
| 9,799,026 | B1 | 10/2017 | Allen et al. |
| 9,875,385 | B1 | 1/2018 | Humphreys et al. |
| 9,922,324 | B2 | 3/2018 | Wilson et al. |
| 9,996,616 | B2 | 6/2018 | Grant et al. |
| 10,108,959 | B2 | 10/2018 | Wolfs et al. |
| 10,185,936 | B2 | 1/2019 | Praisner et al. |
| 10,282,715 | B2 | 5/2019 | Brennan et al. |
| 10,290,016 | B1 | 5/2019 | Rose |
| 10,354,267 | B2 | 7/2019 | Carlson et al. |
| 10,387,881 | B2 | 8/2019 | Studnitzer |
| 10,453,062 | B2 | 10/2019 | Wolfs et al. |
| 10,529,016 | B2 | 1/2020 | Abela et al. |
| 10,535,054 | B1 | 1/2020 | Spitzer |
| 10,552,807 | B2 | 2/2020 | Marcous et al. |
| 10,558,962 | B2 | 2/2020 | Szeto |
| 10,565,630 | B2 | 2/2020 | Haceaturean et al. |
| 10,586,236 | B2 | 3/2020 | Pourfallah et al. |
| 10,607,284 | B2 | 3/2020 | Loganathan et al. |
| 10,643,277 | B2 | 5/2020 | Berta et al. |
| 10,679,285 | B1 | 6/2020 | Kurani et al. |
| 10,699,289 | B1 | 6/2020 | Dalton et al. |
| 10,733,623 | B2 | 8/2020 | Ovick et al. |
| 10,740,843 | B2 | 8/2020 | Shakkarwar |
| 10,743,149 | B2 | 8/2020 | Sewell |
| 10,771,413 | B1 | 9/2020 | Heffron |
| 10,776,751 | B2 | 9/2020 | Chin |
| 10,783,510 | B2 | 9/2020 | George et al. |
| 10,789,580 | B2 | 9/2020 | Wolfs et al. |
| 10,789,641 | B2 | 9/2020 | Lesandro et al. |
| 10,909,508 | B2 | 2/2021 | Fineman et al. |
| 11,468,443 | B2 | 10/2022 | Jones et al. |
| 11,727,430 | B2 | 8/2023 | Mitchell |
| 11,907,945 | B2 | 2/2024 | Jones et al. |
| 2002/0111915 | A1 | 8/2002 | Clemens et al. |
| 2004/0138999 | A1 | 7/2004 | Friedman et al. |
| 2004/0220873 | A1 | 11/2004 | Nolan, III et al. |
| 2005/0004868 | A1 | 1/2005 | Klatt et al. |
| 2005/0049974 | A1* | 3/2005 | Jani ..................... G06Q 20/02 |
| | | | 705/64 |
| 2006/0143124 | A1 | 6/2006 | Ehrke |
| 2007/0198407 | A1 | 8/2007 | Winter |
| 2007/0265946 | A1 | 11/2007 | Schimpf et al. |
| 2007/0288312 | A1 | 12/2007 | Wang |
| 2008/0270246 | A1 | 10/2008 | Chen |
| 2009/0132410 | A1 | 5/2009 | Penney et al. |
| 2009/0164627 | A1 | 6/2009 | Bishop et al. |
| 2009/0234748 | A1* | 9/2009 | Skowronek ......... G06Q 20/145 |
| | | | 705/34 |
| 2009/0271224 | A1 | 10/2009 | Lange |
| 2010/0057606 | A1 | 3/2010 | Louie |
| 2010/0057610 | A1 | 3/2010 | Pinkerton |
| 2010/0211499 | A1 | 8/2010 | Zanzot et al. |
| 2010/0250407 | A1 | 9/2010 | Silva |
| 2011/0099067 | A1 | 4/2011 | Cooper et al. |
| 2011/0191173 | A1 | 8/2011 | Blackhurst |
| 2012/0036013 | A1 | 2/2012 | Neuhaus |
| 2012/0284130 | A1 | 11/2012 | Lewis et al. |
| 2013/0066800 | A1 | 3/2013 | Falcone et al. |
| 2013/0073386 | A1 | 3/2013 | Rose et al. |
| 2013/0073445 | A1 | 3/2013 | Meszaros |
| 2013/0138563 | A1 | 5/2013 | Gilder et al. |
| 2013/0226789 | A1 | 8/2013 | Orttung et al. |
| 2013/0246220 | A1 | 9/2013 | Hammad et al. |
| 2014/0025467 | A1 | 1/2014 | Nagarahan et al. |
| 2014/0067677 | A1 | 3/2014 | Ali et al. |
| 2014/0074688 | A1 | 3/2014 | Shvarts |
| 2014/0095638 | A1 | 4/2014 | Chen |
| 2014/0122331 | A1 | 5/2014 | Vaish et al. |
| 2014/0172687 | A1 | 6/2014 | Chirehdast |
| 2014/0236695 | A1 | 8/2014 | Shvarts et al. |
| 2014/0279444 | A1 | 9/2014 | Kassemi et al. |
| 2014/0279513 | A1 | 9/2014 | Dodds-Brown et al. |
| 2014/0310151 | A1 | 10/2014 | Shishkov et al. |
| 2015/0032525 | A1 | 1/2015 | Blackhurst et al. |
| 2015/0032538 | A1 | 1/2015 | Calman et al. |
| 2015/0046201 | A1 | 2/2015 | Miller et al. |
| 2015/0073902 | A1 | 3/2015 | Soujanya |
| 2015/0100416 | A1 | 4/2015 | Blackhurst et al. |
| 2015/0100481 | A1 | 4/2015 | Ghosh et al. |
| 2015/0112854 | A1 | 4/2015 | Guriel et al. |
| 2015/0170175 | A1 | 6/2015 | Zhang et al. |
| 2015/0193873 | A1 | 7/2015 | Hammock et al. |
| 2015/0228031 | A1 | 8/2015 | Emison et al. |
| 2015/0310490 | A1 | 10/2015 | Meredith et al. |
| 2015/0363762 | A1 | 12/2015 | Kimberg |
| 2016/0034969 | A1 | 2/2016 | Mazurov |
| 2016/0104155 | A1 | 4/2016 | McGaugh et al. |
| 2016/0189292 | A1 | 6/2016 | Deshpande et al. |
| 2016/0196566 | A1 | 7/2016 | Murali et al. |
| 2016/0247177 | A1 | 8/2016 | Zamer |
| 2017/0004501 | A1 | 1/2017 | Ledford et al. |
| 2017/0161826 | A1 | 6/2017 | Packer et al. |
| 2017/0169511 | A1 | 6/2017 | Kelly |
| 2017/0193501 | A1 | 7/2017 | Cole et al. |
| 2017/0221066 | A1 | 8/2017 | Ledford et al. |
| 2017/0270493 | A1 | 9/2017 | Lugli et al. |

(56) References Cited

U.S. PATENT DOCUMENTS

| | | | |
|---|---|---|---|
| 2017/0364878 A1 | 12/2017 | Malhotra et al. | |
| 2018/0018661 A1 | 1/2018 | Wade | |
| 2018/0096335 A1 | 4/2018 | Moghaizel et al. | |
| 2018/0097901 A1 | 4/2018 | Ramachanda | |
| 2018/0174116 A1 | 6/2018 | Maenpaa | |
| 2018/0181928 A1 | 6/2018 | Woo | |
| 2018/0218364 A1* | 8/2018 | Cantrell | G06Q 20/36 |
| 2018/0218453 A1* | 8/2018 | Crabtree | G06N 5/022 |
| 2018/0330354 A1 | 11/2018 | Xiu et al. | |
| 2019/0012645 A1 | 1/2019 | Subramaniam et al. | |
| 2019/0043052 A1 | 2/2019 | Ledford et al. | |
| 2019/0109915 A1 | 4/2019 | McPhee et al. | |
| 2019/0114598 A1 | 4/2019 | Subramaniam et al. | |
| 2019/0114666 A1 | 4/2019 | Kohli | |
| 2019/0220838 A1* | 7/2019 | Olenoski | G06Q 20/405 |
| 2019/0340590 A1 | 11/2019 | Ledford et al. | |
| 2019/0378182 A1 | 12/2019 | Weinflash et al. | |
| 2020/0014642 A1 | 1/2020 | Sidi et al. | |
| 2020/0034813 A1 | 1/2020 | Calinog et al. | |
| 2020/0051117 A1 | 2/2020 | Mitchell | |
| 2020/0074565 A1 | 3/2020 | Dotter | |
| 2020/0082363 A1* | 3/2020 | Hearn | G06Q 20/381 |
| 2020/0104911 A1 | 4/2020 | Suvajac et al. | |
| 2020/0160295 A1 | 5/2020 | Jagalpure et al. | |
| 2020/0242600 A1 | 7/2020 | Stack et al. | |
| 2020/0327529 A1 | 10/2020 | Mukherjee et al. | |
| 2020/0349639 A1 | 11/2020 | Mousseau | |
| 2020/0364760 A1 | 11/2020 | Sabat et al. | |
| 2020/0364784 A1 | 11/2020 | Dill | |
| 2020/0372492 A1* | 11/2020 | Almasan | G06Q 20/3672 |
| 2020/0387878 A1* | 12/2020 | Jones | G06F 21/31 |
| 2021/0150624 A1 | 5/2021 | Tucker et al. | |
| 2021/0271681 A1* | 9/2021 | Jayaram | G06Q 20/027 |
| 2022/0044238 A1 | 2/2022 | Jones et al. | |
| 2022/0051219 A1* | 2/2022 | Sells | H04L 9/50 |
| 2022/0076248 A1 | 3/2022 | Kapoor et al. | |
| 2022/0198411 A1 | 6/2022 | Jones et al. | |
| 2022/0198417 A1 | 6/2022 | Jones et al. | |
| 2022/0198427 A1 | 6/2022 | Jones et al. | |
| 2022/0198432 A1 | 6/2022 | Jones et al. | |
| 2022/0198433 A1 | 6/2022 | Jones et al. | |
| 2022/0198445 A1 | 6/2022 | Jones et al. | |
| 2022/0198501 A1 | 6/2022 | Jones et al. | |
| 2022/0198543 A1 | 6/2022 | Jones et al. | |
| 2022/0383313 A1 | 12/2022 | Jones et al. | |
| 2022/0383314 A1 | 12/2022 | Jones et al. | |
| 2022/0414656 A1 | 12/2022 | Jones et al. | |
| 2023/0055605 A1 | 2/2023 | Jones et al. | |
| 2023/0056173 A1 | 2/2023 | Jones et al. | |
| 2023/0056764 A1 | 2/2023 | Jones et al. | |
| 2023/0153782 A1* | 5/2023 | Hansen | G06Q 20/14 705/40 |
| 2023/0230054 A1* | 7/2023 | Livesay | G06Q 20/02 705/39 |

FOREIGN PATENT DOCUMENTS

| | | |
|---|---|---|
| CN | 104321738 | 6/2018 |
| IN | 202011016562 | 6/2020 |
| KR | 20060003230 | 1/2006 |
| KR | 20170127418 | 11/2014 |
| KR | 20160140969 | 12/2016 |
| KR | 10-2073974 B1 | 2/2020 |
| WO | WO 2001050370 | 7/2001 |
| WO | WO 2002069290 | 9/2002 |
| WO | WO 2003025712 | 3/2003 |
| WO | WO 2012151571 | 11/2012 |
| WO | WO 2013044286 | 4/2013 |
| WO | WO 2016190810 | 1/2016 |
| WO | WO 2019071263 | 4/2019 |

OTHER PUBLICATIONS

STIC Search Report, Oct. 12, 2023 (4 pages).
STIC Search Report, May 5, 2023 (4 pages).
Quibria, "Introduction to ISO 20022 for U.S. Financial Institutions", NACHA—3 The Electronic Payments Association; 45 pgs. (2015).
Wandhofer et al., "The Future of Correspondent Banking Cross Border Payments", Swift Institute Working Paper No. 2017-01; 63 pgs. (2018).
Rogers, The Definitive Guide to eCommerce Product Reviews (2017).
Khanna, "Venmo'ed: Sharing Your Payment Data with the World," Technology Science, 2018102901, Oct. 28, 2015 (27 pages).
STIC Search Report, Sep. 17, 2023 (4 pages).
Cohen, et al., "Ride on! Mobility business models for the sharing economy," Organization & Environment, 27.3, 2014, pp. 279-296.
FIS, Flavors of Fast, Report; 59 pages (2019).
INFOSYS, "Global Trends in the Cards and Payments Industry", 40 pgs. (2020).
Sullivan, "Sick of Overdraft Fees? There's an App for that." 8 pgs. (2018).
"POS Financing: There's a Lending Marketplace for That," PYMINTS. com; 19 pgs., (2020).
Target is LIVE with Afterpay.com; 4 pgs., (2021).
"Klama's Marketing Strategy: The Unique Growth Story Behind The Brand," 14 pgs. (2021).

* cited by examiner

202

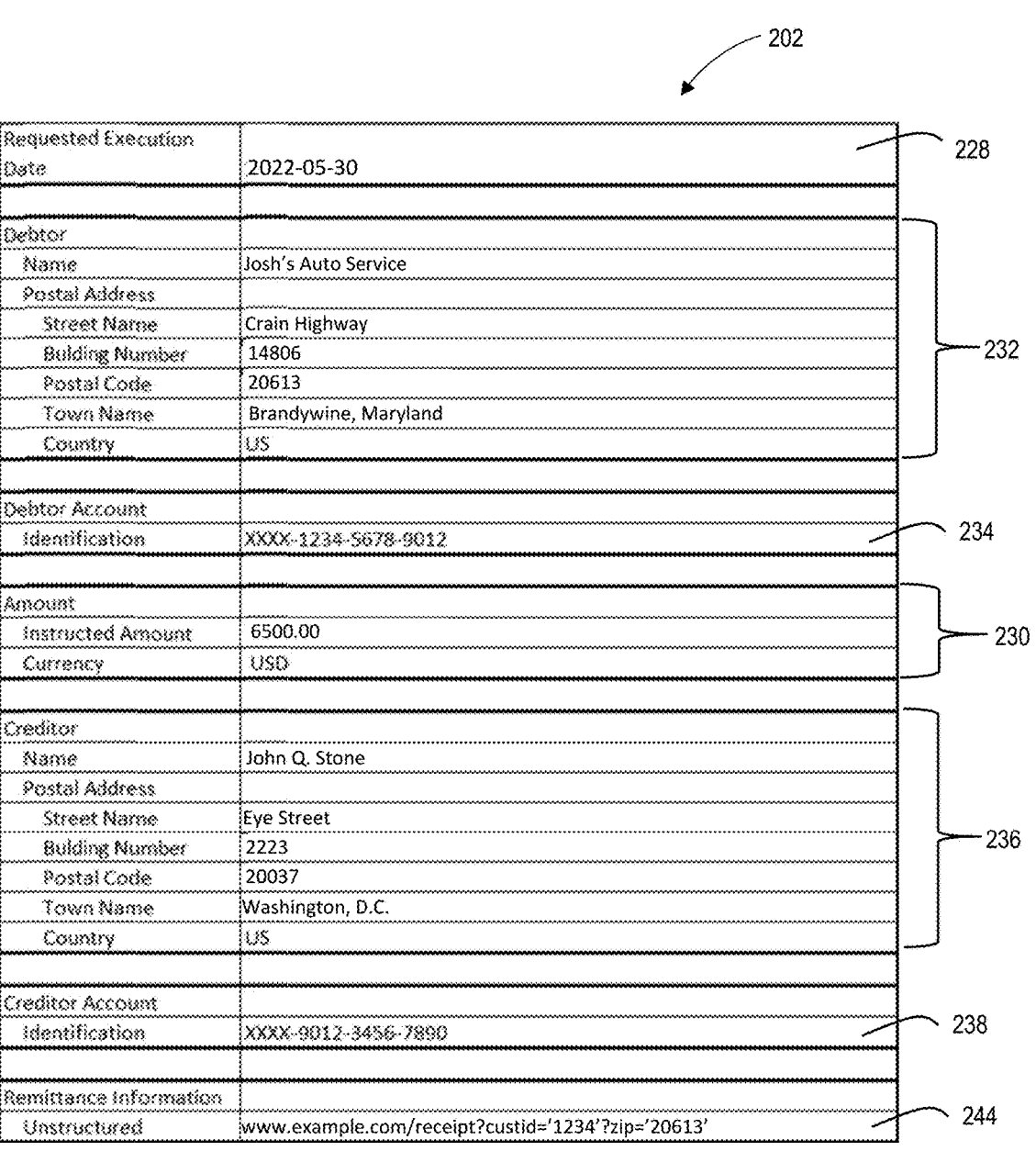

| | | |
|---|---|---|
| Requested Execution Date | 2022-05-30 | 228 |
| | | |
| Debtor | | |
|   Name | Josh's Auto Service | |
|   Postal Address | | |
|     Street Name | Crain Highway | |
|     Building Number | 14806 | 232 |
|     Postal Code | 20613 | |
|     Town Name | Brandywine, Maryland | |
|     Country | US | |
| | | |
| Debtor Account | | |
|   Identification | XXXX-1234-5678-9012 | 234 |
| | | |
| Amount | | |
|   Instructed Amount | 6500.00 | 230 |
|   Currency | USD | |
| | | |
| Creditor | | |
|   Name | John Q. Stone | |
|   Postal Address | | |
|     Street Name | Eye Street | |
|     Building Number | 2223 | 236 |
|     Postal Code | 20037 | |
|     Town Name | Washington, D.C. | |
|     Country | US | |
| | | |
| Creditor Account | | |
|   Identification | XXXX-9012-3456-7890 | 238 |
| | | |
| Remittance Information | | |
|   Unstructured | www.example.com/receipt?custid='1234'?zip='20613' | 244 |

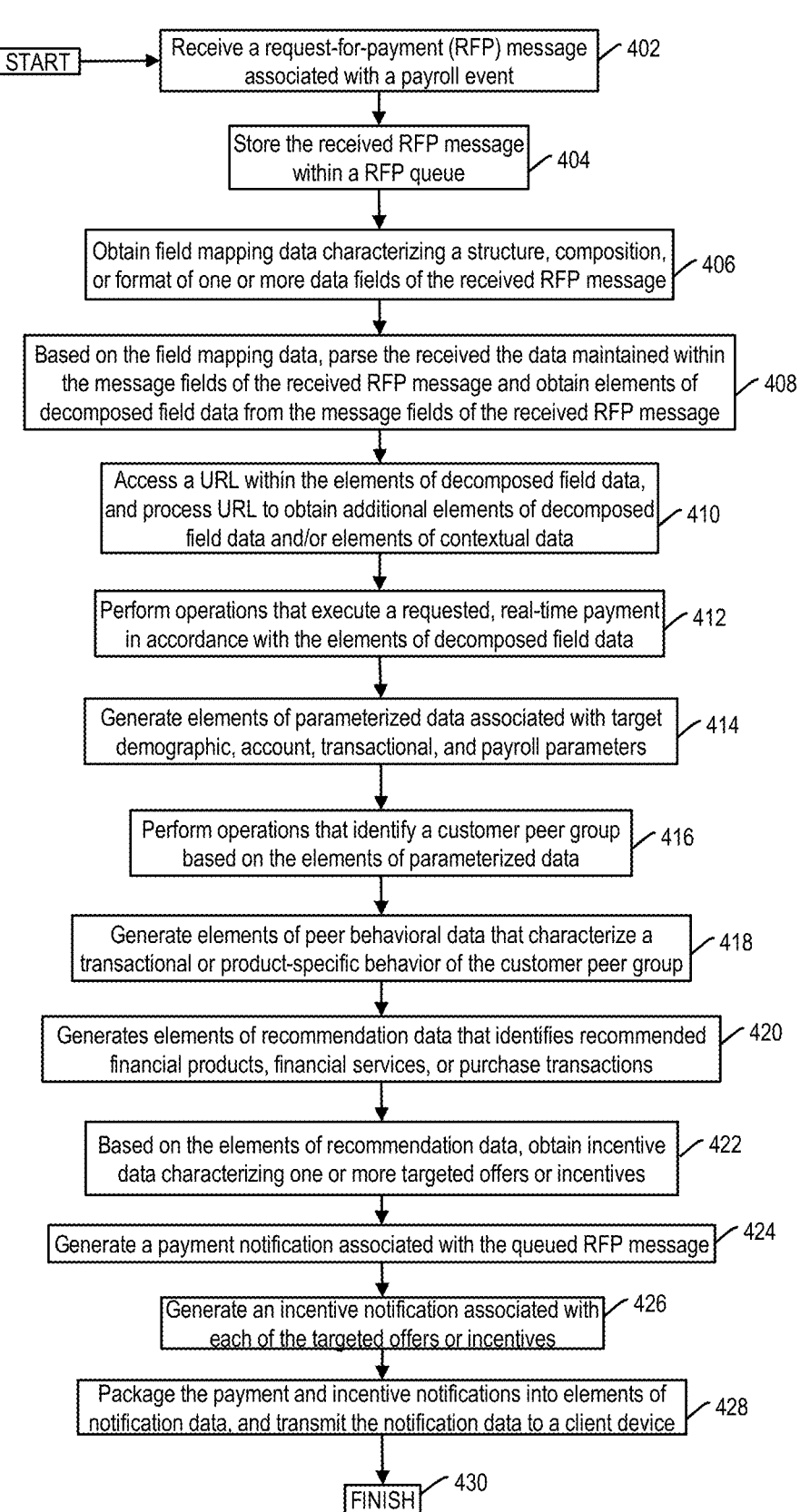

START → Receive a request-for-payment (RFP) message associated with a payroll event ⟋ 402

Store the received RFP message within a RFP queue ⟋ 404

Obtain field mapping data characterizing a structure, composition, or format of one or more data fields of the received RFP message ⟋ 406

Based on the field mapping data, parse the received the data maintained within the message fields of the received RFP message and obtain elements of decomposed field data from the message fields of the received RFP message ⟋ 408

Access a URL within the elements of decomposed field data, and process URL to obtain additional elements of decomposed field data and/or elements of contextual data ⟋ 410

Perform operations that execute a requested, real-time payment in accordance with the elements of decomposed field data ⟋ 412

Generate elements of parameterized data associated with target demographic, account, transactional, and payroll parameters ⟋ 414

Perform operations that identify a customer peer group based on the elements of parameterized data ⟋ 416

Generate elements of peer behavioral data that characterize a transactional or product-specific behavior of the customer peer group ⟋ 418

Generates elements of recommendation data that identifies recommended financial products, financial services, or purchase transactions ⟋ 420

Based on the elements of recommendation data, obtain incentive data characterizing one or more targeted offers or incentives ⟋ 422

Generate a payment notification associated with the queued RFP message ⟋ 424

Generate an incentive notification associated with each of the targeted offers or incentives ⟋ 426

Package the payment and incentive notifications into elements of notification data, and transmit the notification data to a client device ⟋ 428

FINISH ⟋ 430

FIG. 4A

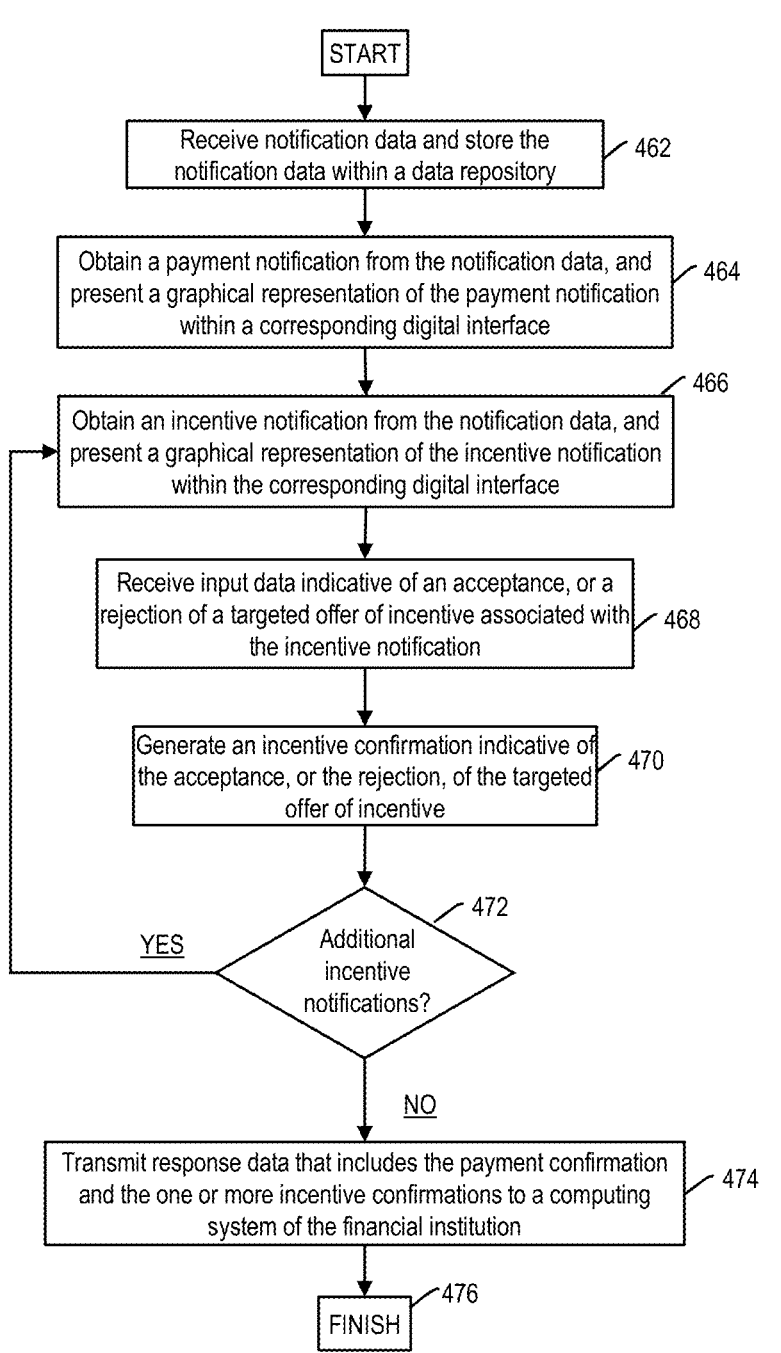

460

START

Receive notification data and store the
notification data within a data repository ╱ 462

Obtain a payment notification from the notification data, and
present a graphical representation of the payment notification
within a corresponding digital interface ╱ 464

Obtain an incentive notification from the notification data, and
present a graphical representation of the incentive notification
within the corresponding digital interface ╱ 466

Receive input data indicative of an acceptance, or a
rejection of a targeted offer of incentive associated with
the incentive notification ╱ 468

Generate an incentive confirmation indicative of
the acceptance, or the rejection, of the targeted
offer of incentive ╱ 470

Additional
incentive
notifications? ╱ 472

YES

NO

Transmit response data that includes the payment confirmation
and the one or more incentive confirmations to a computing
system of the financial institution ╱ 474

FINISH ╱ 476

FIG. 4B

REAL-TIME PROVISIONING OF TARGETED DIGITAL CONTENT BASED ON DECOMPOSED STRUCTURED MESSAGING DATA AND PEER DATA

CROSS-REFERENCE TO RELATED APPLICATION

This application claims the benefit of priority under 35 U.S.C. § 119(e) to prior U.S. Provisional Application No. 63/194,757, filed May 28, 2021, the disclosure of which is incorporated by reference herein to its entirety.

TECHNICAL FIELD

The disclosed embodiments generally relate to computer-implemented systems and processes that provision, in real-time, targeted, event-specific digital content based on decomposed, structured messaging data and peer data.

BACKGROUND

The mass adoption of smart phones and digital payments within the global marketplace drives an increasingly rapid adoption of real-time payment (RTP) technologies by financial institutions, consumers, vendors and merchants, and other participants in the payment ecosystem. Many RTP technologies emphasize data, messaging, and global interoperability and in contrast to many payment rails, such as those that support credit card payments, embrace the near ubiquity of mobile technologies in daily life.

SUMMARY

In some examples, an apparatus includes a communications interface, a memory storing instructions, and at least one processor coupled to the communications interface and to the memory. The at least one processor is configured to execute the instructions to receive, via the communications interface, a message associated with an exchange of data involving a first counterparty and a second counterparty. The message includes message data disposed within corresponding message fields, and the message data characterizes a real-time payment from the second counterparty to the first counterparty. The at least one processor is configured to execute the instructions to, based on one or more of the elements of message data, determine a value of at least one parameter that characterizes the first counterparty and obtain elements of peer data that are consistent with the at least one parameter value. The at least one processor is configured to execute the instructions to transmit, via the communication interface, notification data to a device operable by the first counterparty. The notification data includes digital content associated with at least one of the elements of peer data or at least one parameter value. The notification data causes an application program executed at the device to present the digital content within a digital interface.

In other examples, a computer-implemented method, includes receiving, using at least one processor, a message associated with an exchange of data involving a first counterparty and a second counterparty. The message includes elements of message data disposed within corresponding message fields, and the message data characterizes a real-time payment from the second counterparty to the first counterparty. The computer-implemented method includes, based on one or more of the elements of message data, determining, using the at least one processor, a value of at least one parameter that characterizes the first counterparty and obtaining elements of peer data that are consistent with the at least one parameter value. The computer-implemented method includes transmitting notification data to a device operable by the first counterparty using the at least one processor. The notification data includes digital content associated with at least one of the elements of peer data or at least one parameter value. The notification data causes an application program executed at the device to present the digital content within a digital interface.

Further, in some examples, a tangible, non-transitory computer-readable medium stores instructions that, when executed by at least one processor, cause the at least one processor to perform a method that includes receiving a message associated with an exchange of data involving a first counterparty and a second counterparty. The message includes elements of message data disposed within corresponding message fields, and the message data characterizes a real-time payment from the second counterparty to the first counterparty. The method includes, based on one or more of the elements of message data, determining a value of at least one parameter that characterizes the first counterparty and obtaining elements of peer data that are consistent with the at least one parameter value. The method includes transmitting notification data to a device operable by the first counterparty. The notification data includes digital content associated with at least of the elements of peer data or at least one parameter value. The notification data is configured to perform operations of an application program executed at the device to present the digital content within a digital interface.

It is to be understood that both the foregoing general description and the following detailed description are exemplary and explanatory only and are not restrictive of the invention, as claimed. Further, the accompanying drawings, which are incorporated in and constitute a part of this specification, illustrate aspects of the present disclosure and together with the description, serve to explain principles of the disclosed embodiments as set forth in the accompanying claims.

BRIEF DESCRIPTION OF THE DRAWINGS

FIG. 2B illustrates portions of an exemplary request for payment (RFP) message, in accordance with some exemplary embodiments.

FIGS. 4A, 4B, and 4C are flowcharts of exemplary processes for provisioning targeted digital content associated with an initiated exchange of data in real-time, and contemporaneously with the initiation of the data exchange, in accordance with some embodiments.

Like reference numbers and designations in the various drawings indicate like elements.

DETAILED DESCRIPTION

Figure 1:
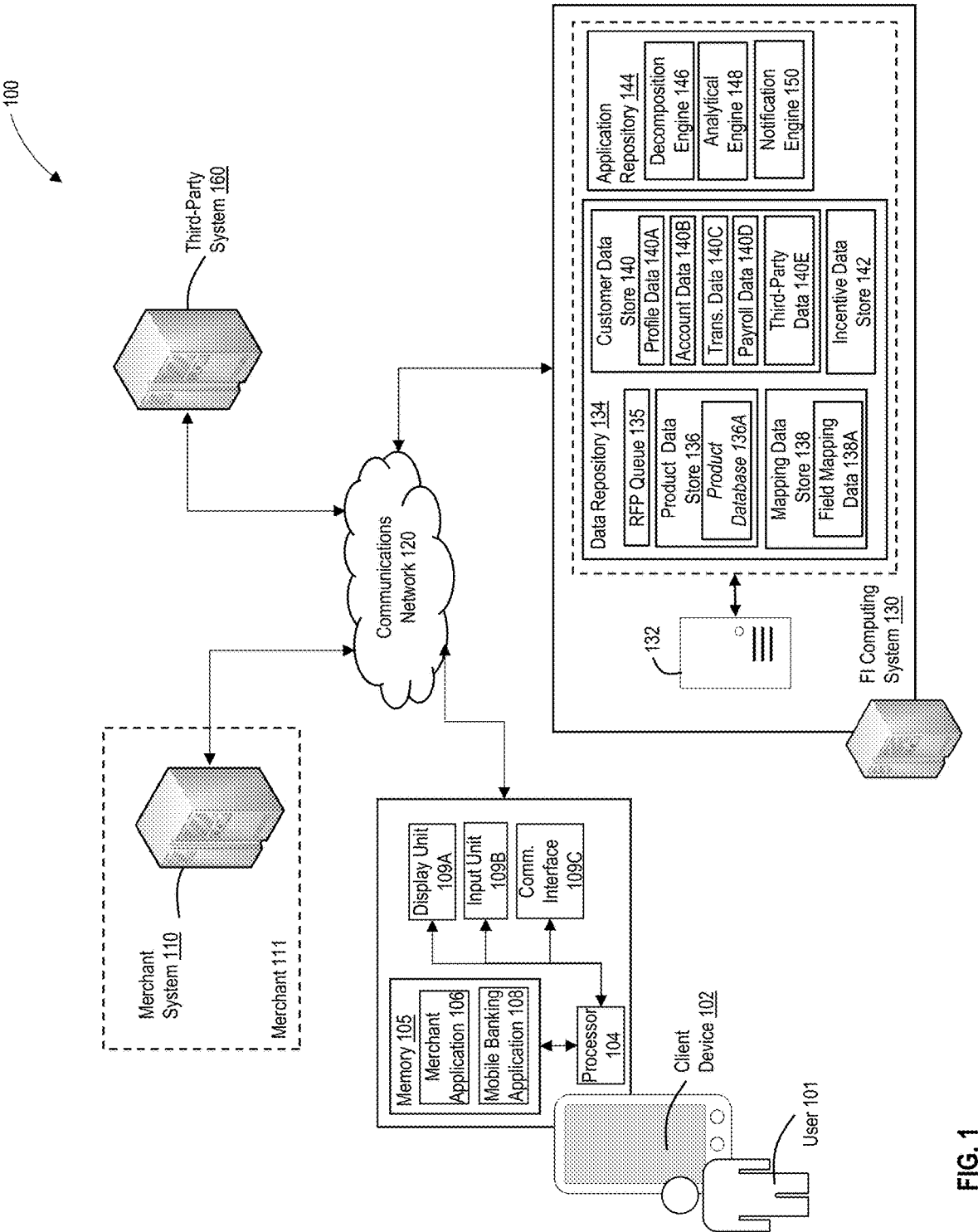
FIG. 1 is a block diagram of an exemplary computing environment, in accordance with some exemplary embodiments.

Today, the mass adoption of smart phones and digital payments within the global marketplace drives an adoption of real-time payment (RTP) technologies by financial institutions, consumers, vendors and merchants, and other participants in the payment ecosystem. These RTP technologies often emphasize data, messaging, and global interoperability and in contrast to conventional payment rails, may embrace the near ubiquity of mobile technologies in daily life to provide, to the participants in the RTP ecosystem, real-time service and access to funds. To facilitate the strong emphasis on data, messaging, and global interoperability between financial institutions, many RTP technologies adopt, and exchange data formatted in accordance with, one or more standardized data-exchange protocols, such as the ISO 20022 standard for electronic data exchange between financial institutions.

For example, a customer of a financial institution, such as user 101, may receive a payment for wages earned during a corresponding payroll period in accordance with a predetermined temporal schedule, e.g., on a daily basis, a weekly basis (e.g., each Friday), on a semi-monthly basis (e.g., on the $15^{th}$ and $30^{th}$ days of each month), or on a monthly basis (e.g., on the $30^{th}$ day of each month). Each of the regular payments of wages to the customer by the employer (e.g., in accordance with the predetermined temporal schedule) may correspond to, and may establish, an occurrence of a payroll event involving the customer and initiated by the employer (e.g., a counterparty to the payroll event). In some instances, the employer, or a payroll provider of the employer, may generate, and provision to the customer, a check in an amount consistent with the wages, and the customer may deposit that check into a corresponding account at the financial institution, e.g., via person interaction at a branch of the financial institution or via interactions with a mobile banking executed at a corresponding customer device. Additionally, or alternatively, the employer's financial institution, or the payroll provider, may initiate an electronic transfer of funds from an account of the employer, to an account of the customer maintained by the financial institution, in an amount consistent with the wages and in accordance with the predetermined temporal schedule, e.g., via an automated clearinghouse (ACH) direct deposit.

Although the user 101 may present the physical check for deposit within the customer account at the financial institution on a corresponding business day, one or more check-clearing processes implemented by the financial institution, and by a financial institution of the employer often delay an availability of all, or at least a portion of the funds, within the customer account for up to two business days, and in some instances, up to five business days. Further, payment processing networks that clear and settle initiated electronic transfers of funds, including ACH direct deposits, between the account at the employer's financial institution and the customer account may also be associated with processing period ranging from one to three business days, depending on a time at which the employer's financial institution, or the employer's initiated the electronic transfer of funds or the ACH direct deposit (e.g., prior to, or subsequent to, a processing cutoff time during each business day).

In other examples, the financial institutions of the employer and the customer (and in some instances, the payroll provider of the employer) may participate in the RTP ecosystem, and a computing system of the employer's financial institution (or the employer's payroll provider) may generate a message, e.g., a Request for Payment (RFP) message, that requests, on a corresponding payment date, a real-time payment from the employer account at the employer's financial institution to the customer account at the customer's financial institution in an amount consistent with wages earned during a corresponding pay period. The one or more computing systems of the employer's financial institution (or the one or more computing systems of the employer's payroll provider) may transmit the RFP message to one or more computing systems of the customer's financial institution of the customer, e.g., directly or through one or more intermediate systems associated with the RTP ecosystem, such as a clearinghouse system.

The generated and transmitted RFP message may, for example, be formatted in accordance with the ISO 20022 data-exchange format, and may include message fields populated with information that includes, but is not limited to, information identifying the customer and the employer, and information identifying the payroll event initiated by the employer and involving the customer (e.g., a requested payment amount, a requested payment date, an identifier of the employer account selected by the employer to fund the requested, real-time payment, or an identifier of the customer account capable of receiving the funds from the requested, real-time payment, etc.). Further, the ISO-20022-compliant RFP message may also include a link within a structured or unstructured message field to information, such as formatted paystub data, associated with the requested, real-time payment for the wages earned by the customer (e.g., a long- or shortened Uniform Resource Location (URL) pointing to a paystub in PDF or HTML form that includes any of the information described herein).

In some examples, the elements of structured or unstructured data maintained within the message fields of exemplary, ISO-20022-compliant RFP messages described herein may extend beyond the minimal content provided within a memo or reference line of a physical check, and beyond the often-limited content of the message data transmitted across many existing transaction processing networks, such as those that facilitate an initiation, a clearance, and a settlement of initiated electronic funds transfers or ACH direct deposits. When intercepted and processed by the one or more computing systems of the customer's financial institution, these elements of structured or unstructured RFP message data may be processed to, among other things, identify one or more additional customers of the financial institution (e.g., a "customer peer group") that are characterized by values of the one or more demographic, account, transactional, and payroll parameters similar to corresponding parameter values that characterize the customer, and to generate account- or transaction-specific elements of behavioral data that identify and characterize the interactions between these additional customers and the financial institution during a current or prior temporal interval.

Further, when intercepted and processed by the one or more computing systems of the customer's financial institution, these elements of structured or unstructured RFP message data may also enable the one or more computing systems to generate dynamically elements of recommendation data that identify and characterize recommended financial products, financial services, or purchase transactions of potential interest to the customer based on demographic-, payroll-, account- or transaction-based similarities between the customer and the additional customers of the customer peer group, identify one or more targeted offers or incentives that are available to the customer and that are associated with one or more of the recommended financial products, financial services, or purchase transactions, and provision, to a device of the customer in real-time and contemporaneously with the receipt of the RFP message, elements of digital content of that not only confirm an execution of the requested, real-time payment of the funds to the customer and an availability of the funds within the customer account, but that also prompt the customer to accept, or reject, each or a selected subset of the targeted offers of incentives.

Certain of the exemplary processes described herein, which decompose the structured message fields of an ISO-20022-compliant RFP message to obtained elements of decomposed message data characterizing the customer, the employer, and the payroll event initiated by the employer and involving the customer, and which analyze the elements of decomposed message data to identify one or more targeted offers and incentives consistent with demographic-, payroll-, account- or transaction-based similarities between the customer and a customer peer group of additional customers of the financial institution, and which provision data characterizing the one or more targeted offers and incentives to the customer device for presentation within a digital interface in real-time and contemporaneously with the initiation of the payroll event, the receipt of the RFP message, and the execution of the requested, real-time payment to the customer, may be implemented in addition to, or as an alternate to, many processes that relay on the minimal content available within processes negotiable instruments and the often-limited content of message data transmitted across many transaction processing networks.

A. Exemplary Computing Environments

FIG. 1 is a diagram illustrating an exemplary computing environment 100 that includes, among other things, one or more computing devices, such as a client device 102, and one or more computing systems, such as a merchant system 110, a financial institution (FI) system 130, and a third-party computing system 160, each of which may be operatively connected to, and interconnected across, one or more communications networks, such as communications network 120. Examples of communications network 120 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet.

Client device 102 may include a computing device having one or more tangible, non-transitory memories, such as memory 105, that store data and/or software instructions, and one or more processors, e.g., processor 104, configured to execute the software instructions. The one or more tangible, non-transitory memories may, in some aspects, store software applications, application modules, and other elements of code executable by the one or more processors, such as, but not limited to, an executable web browser (e.g., Google Chrome™, Apple Safari™, etc.), an executable application associated with provider system 214 (e.g., merchant application 106), and additionally or alternatively, an executable application associated with FI computing system 130 (e.g., mobile banking application 108). In some instances, not illustrated in FIG. 1, memory 105 may also include one or more structured or unstructured data repositories or databases, and client device 102 may maintain one or more elements of device data and location data within the one or more structured or unstructured data repositories or databases. For example, the elements of device data may uniquely identify client device 102 within computing environment 100, and may include, but are not limited to, an Internet Protocol (IP) address assigned to client device 102 or a media access control (MAC) layer assigned to client device 102.

Client device 102 may also include a display unit 109A configured to present interface elements to a corresponding user, such as a user 101, and an input unit 109B configured to receive input from user 101, e.g., in response to the interface elements presented through display unit 109A. By way of example, display unit 109A may include, but is not limited to, an LCD display unit or other appropriate type of display unit, and input unit 109B may include, but is not limited to, a keypad, keyboard, touchscreen, voice activated control technologies, or appropriate type of input unit. Further, in additional aspects (not illustrated in FIG. 1), the functionalities of display unit 109A and input unit 109B may be combined into a single device, e.g., a pressure-sensitive touchscreen display unit that presents interface elements and receives input from user 101. Client device 102 may also include a communications interface 109C, such as a wireless transceiver device, coupled to processor 104 and configured by processor 104 to establish and maintain communications with communications network 120 via one or more communication protocols, such as WiFi®, Bluetooth®, NFC, a cellular communications protocol (e.g., LTE®, CDMA®, GSM®, etc.), or any other suitable communications protocol.

Examples of client device 102 may include, but are not limited to, a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs)), an embedded computing device (e.g., in communication with a smart textile or electronic fabric), and any other type of computing device that may be configured to store data and software instructions, execute software instructions to perform operations, and/or display information on an interface device or unit, such as display unit 109A. In some instances, client device 102 may also establish communications with one or more additional computing systems or devices operating within environment 100 across a wired or wireless communications channel, e.g., via the communications interface 109C using any appropriate communications protocol. Further, user 101 may operate client device 102 and may do so to cause client device 102 to perform one or more exemplary processes described herein.

Merchant system 110, FI computing system 130, and third-party system 160 may each represent a computing system that includes one or more servers and one or more tangible, non-transitory memory devices storing executable code, application engines, or application modules. Each of the one or more servers may include one or more processors, which may be configured to execute portions of the stored code, application engines, or application modules to perform operations consistent with the disclosed exemplary embodiments. For example, as illustrated in FIG. 1, the one or more servers of FI computing system 130 may include server 132 having one or more processors configured to execute portions of the stored code, application engines, or application modules maintained within the one or more corresponding, tangible, non-transitory memories. In some instances, merchant system 110, FI computing system 130, and/or third-party system 160 may correspond to a discrete computing system, although in other instances, merchant system 110, FI computing system 130, and/or third-party system 160 may correspond to a distributed computing system having multiple, computing components distributed across an appropriate computing network, such as communications network 120 of FIG. 1A, or those established and maintained by one or more cloud-based providers, such as Microsoft Azure™, Amazon Web Services™, or another third-party, cloud-services provider. Further, each of merchant system 110, FI computing system 130, and/or third-party system 160 may also include one or more communications units, devices, or interfaces, such as one or more wireless transceivers, coupled to the one or more processors for accommodating wired or wireless internet communication across network 120 with other computing systems and devices operating within environment 100 (not illustrated in FIG. 1).

By way of example, merchant system 110 may be associated with, or operated by, a merchant 111 that offers products or services for sale to one or more customers, such as, but not limited to, user 101 that operates client device 102. In some instances, merchant system 110 may exchange data programmatically with one or more application programs executed at client device 102, such as merchant application 106, and based on the programmatically exchanged data, client device 102 may perform any of the exemplary processes described herein to initiate a transaction to purchase one or more of the products or services offered for sale by merchant 111. Further, and as described herein, FI computing system 130 may be associated with, or operated by, a financial institution that offers financial products or services to one or more customers, such as, but not limited to, user 101. The financial products or services may, for example, include a payment instrument issued to user 101 by the financial institution and available to fund the initiated purchase transaction, and examples of the payment instrument may include, but are not limited to, a credit card account issued by the financial institution or a checking, savings, or other deposit account issued by and maintained at the financial institution.

In some instances, a relationship may exist between merchant 111 and a financial institution associated with FI computing system 130. By way of example, merchant 111 may correspond to a business customer of the financial institution, and additionally, or alternatively, merchant 111 may represent a merchant partner of the financial institution, and based on the relationship with the financial institution, merchant 111 may elect, or agree, to provision one or more targeted offers or incentives to certain customers of the financial institution, such as, but not limited to, user 101. The one or more targeted offers or incentives may, for instance, include a discount on a purchase transaction initiated by a corresponding customer, such as user 101, that involves a predetermined product or service, or is associated with a predetermined value of a transaction parameter (e.g., a transaction associated with a transaction amount that exceeds a predetermined threshold value, etc.), and that is funded by a financial product or payment instrument issued by the financial institution. Further, although not illustrated in FIG. 1, merchant system 110 may maintain, within a portion of one or more of the tangible, non-transitory memories, data that identifies and characterizes each of the transaction-specific incentives available for provisioning to the customers of the financial institution (e.g., data that identifies the predetermined product or service, the predetermined value of the transaction parameter, and/or the corresponding financial product or service).

Further, third-party computing system 160 may be associated with, operated by, one or more governmental, judicial, regulatory, or reporting entities unrelated to the financial institution associated with FI computing system 130. By way of example, third-party computing system 160 may be associated with, and operated by, a credit bureau, and third-party computing system 160 may maintain, within one or more tangible, non-transitory memories (not illustrated in FIG. 1), elements of credit bureau data associated with one or more of the customers of the financial institution, such as, but not limited to a credit score or data characterizing one or more credit inquiries during corresponding temporal intervals. In other examples, third-party computing system 160 may be associated with, and operated by, governmental entity (e.g., a tax or revenue agency), such as elements of governmental data that identify one or more parcels of real estate held by corresponding customers of the financial institution, vehicles held by the corresponding customers of the financial institution, or other elements of real property held by the corresponding customer of the financial institution. In some instances, described herein, third-party computing system 160 may perform operations that provision customer-specific elements of third-party data (e.g., the credit-bureau or governmental data described herein, etc.) across network 120 to FI computing system 130 in accordance with a predetermined temporal schedule (e.g., daily, weekly, monthly, etc.), in real-time on a continuous, streaming basis, or in response to a request received by FI computing system 130.

Referring back to FIG. 1, FI computing system 130 may perform any of the exemplary processes described herein to obtain, receive, or intercept a request-for-payment (RFP) message associated with a corresponding payroll event involving a customer of the financial institution, such as user 101, and a counterparty, such as employer of user 101. In some instances, the payroll event may be initiated by the counterparty, and may represent a real-time transfer of funds from an account of the counterparty to a corresponding account of user 101 (e.g., a deposit account maintained at the financial institution) in accordance with a predetermined, temporal schedule. The real-time transfer may, in some instances, correspond to a real-time payment from the counterparty to user 101 for wages earned during a corresponding payroll period, such as a daily, weekly, bi-weekly, semi-monthly, or monthly basis, and as described herein, the received RFP message may be formatted and structured in accordance with one or more standardized data-exchange protocols, such as the ISO 20022 standard for electronic data exchange between financial institutions. Further, and based on elements of mapping data that characterize a structure, composition, or format of one or more data fields of the ISO-20002-compliant RFP message, FI computing system 130 may perform any of the exemplary processes described herein to decompose the received RFP message and obtain message data characterizing the user 101, the counterparty (e.g., the employer), and additionally, or alternatively, the initiated payroll event (e.g., the real-time payment for wages in accordance with the predetermined temporal schedule).

Based on the elements of decomposed message data characterizing user 101, the counterparty, and the initiated payroll event, and in some instances, based on additional elements of customer, account, transaction, or reporting data associated with user 101, FI computing system 130 may also perform any of the exemplary processes described herein to determine values of one or more demographic, account, transactional, and payroll parameters that characterize user 101, an interaction between user 101 and one or more financial products or services provisioned by the financial institution, and regularly occurring payroll events involving user 101 during a current temporal interval, or across one or more prior temporal intervals. In some instances, based on the determined parameter values, and based on elements of customer, account, transaction, or reporting data associated with one or more additional customers of the financial institution, FI computing system 130 may also perform any of the exemplary processes described herein to identify a subset of the additional customers of the financial institution, e.g., a "customer peer group" of the additional customers, characterized by values of the demographic, account, transactional, and payroll parameters that are similar to those parameter values that characterize user 101.

FI computing system 130 may access the elements of customer, account, transaction, or reporting data associated with each of the additional customers within the customer peer group, and based on the elements of the customer, account, transaction, or reporting data associated with the customer peer group, FI computing system 130 may perform any of the exemplary processes described herein to generate elements of peer behavioral data that characterize the additional customers within the customer peer group during a current or across one or more prior temporal intervals. The elements of peer behavioral data may, for example, identify and characterize one or more financial products issued by the financial institution and held by additional customers of the customer peer group (e.g., payment instruments, secured or unsecured credit products, etc.), and one or more purchase transactions initiated by the additional customers of the customer peer group, during a current temporal interval or across one or more prior temporal intervals, and in some instances, the elements of peer behavioral data provide insights on the purchasing habits of these additional customers and on the interactions between these additional customers and the financial institution.

Further, and based on the elements of peer behavioral data associated with the additional customers of the customer peer group, and based on the additional elements of customer, account, transaction, or reporting data associated with user 101 (including elements of the decomposed message data), FI computing system 130 may perform any of the exemplary processes described herein to generate elements of recommendation data that, among other things, identify and characterize financial products, financial services, or purchase transactions that may be of potential interest to user 101 based on demographic-, payroll-, account- or transaction-based similarities between the customer and the additional customers of the customer peer group. In some instances, and based on the recommendation data, FI computing system 130 may also perform operations, described herein that package elements of digital content characterizing one or more targeted offers or incentives associated with each, or a selected subset, of the recommended financial products, financial services, or purchase transactions into corresponding portions of a customer notification, which FI computing system 130 may transmit across communications network 120 to client device 102 in real-time and contemporaneously with an occurrence of the payroll event and a receipt of the RFP message.

As described herein, client device 102 may receive the transmitted customer notification, and one or more application programs executed at client device 102, such as mobile banking application 108, may perform any of the exemplary processes described herein to present interface elements characterizing each, or a selected subset, of the targeted offers or incentives within one or more portions of a corresponding digital interface (e.g., via display unit 109A). For example, the presented interface elements may prompt user 101 to provide input to client device 102 (e.g., via input unit 109B) that accepts one or more of the targeted offers or incentives consistent with the demographic-, payroll-, account- or transaction-based similarities between user and the customer peer group, in real-time and contemporaneously with the occurrence of the payroll event and the receipt of the RFP message by FI computing system 130.

To facilitate a performance of one or more of these exemplary processes, FI computing system 130 may maintain, within the one or more tangible, non-transitory memories, a data repository 134 that includes, but is not limited to, a request-for-payment (RFP) message queue 135, a product data store 136, a mapping data store 138, a customer data store 140, and an incentive data store 142. As described herein, RFP message queue 135 may include one or more discrete RFP messages received by FI computing system 130 using any of the exemplary processes described herein. In some instances, the RFP messages maintained within RFP message queue 135 may be prioritized in accordance with a time or date of receipt by FI computing system 130 or with data characterizing a requested, or initiated, payment associated with each of the RFP messages, and each of the prioritized RFP messages may be associated with a corresponding temporal pendency. Further, FI computing system 130 may perform operations that maintain each of the prioritized RFP messages within RFP message queue 135 until an execution of a corresponding one of the requested, or initiated, payments (e.g., a debit of funds associated with a requested payment from a corresponding customer account, or a credit of funds associated with an initiated payment into a corresponding customer account), or until an expiration of the corresponding pendency period.

Product data store 136 may include one or more structured or unstructured data records that establish a database 136A of financial products or financial services available for provisioning to customers of the financial institution. Examples of the financial products include, but are not limited to, unsecured, personal loan, installment loans, home mortgage products, or secured or unsecured credit products, and the data records of product database 136A may include, for each of the financial products, a corresponding product identifiers and data characterizing one or more internal qualification or underwriting procedures associated with a provisioning of the corresponding financial product to user 101. Mapping data store 138 may include structured or unstructured data records that maintain one or more elements of field mapping data 138A. For example, and as described herein, FI computing system 130 may receive, obtain, or intercept one or more RFP messages, each of which may be formatted and structured in accordance with a corresponding, standardized data-exchange protocol, such as the ISO 20022 standard for electronic data exchange between financial institutions. In some instances, the one or more elements of field mapping data 138A may characterize a structure, composition, or format of the message data populating one or more data fields of the ISO-20002-compliant RFP message, or a corresponding RFP message compliant with an additional, or alternate, standardized data-exchange protocol.

In some instances, customer data store 140 may include structured or unstructured data records that maintain information identifying and characterizing one or more customers of the financial institution, and further, interactions between these customers and not only the financial institution, but also other unrelated third parties, such as the merchants or retailers described herein. For example, as illustrated in FIG. 1, customer data store 140 may include one or more elements of customer profile data 140A, which identify and characterize corresponding ones of the customers of the financial institution, one or more elements of account data 140B, which may identify and characterize one or more accounts held by the customers, one or more elements of transaction data 140C, which identify and characterize prior purchase or payment transactions involving the customers of the financial institution (such as, but not limited to, user 101), one or more elements of payroll data 140D, which identify and characterize one or more payroll events associated with, or involving, corresponding ones of the customers of the financial institution, and one or more elements of third-party data 140E associated with corresponding customers of the financial institution.

By way of example, for a corresponding one of the customer, such as user 101, the elements of customer profile data 140A may include, but are not limited to, a customer identifier of user 101 (e.g., an alphanumeric login credential, a customer name, etc.), a postal address of user 101, and values of one or more demographic parameters characterizing user 101 (e.g., a customer age, customer profession, etc.). The accounts held by the customers of the financial institution may include, but are not limited to, a deposit account (e.g., a checking or a savings account issued by the financial institution), a credit-card account, or an account associated with an additional, or alternate, financial product, such as an unsecured personal loan or an installment loan, and the elements of account data 140B may include, for an account held by a corresponding one of the customers, such as user 101, the customer identifier of user 101, all or a portion of an account number (e.g., an actual account number, a tokenized account number, etc.), and data characterizing a status of the account (e.g., a current balance, an overdue balance, length of account existence, etc.) and interactions between user 101 and the account (e.g., amounts and dates of withdrawals, etc.). Further, the elements of transaction data 140C may include the customer identifier of user 101, data identifying one or more prior purchase or payment transactions initiated by user 101 (e.g., a unique, alphanumeric transaction identifier assigned by FI computing system 130), and may include values of transaction parameters that characterize each of the prior purchase or payment transactions, such as a transaction data or time, a transaction amount, an identifier of a corresponding counterparty, or an identifier of an account (e.g., an account number, etc.) that funds, or receives proceeds from, the prior purchase or payment transaction.

In some instances, the elements of payroll data 140D may include, for a corresponding one of the customers, such as user 101, and a corresponding one of the payroll events, the customer identifier of user 101, one or more elements of counterparty data that identify and characterize a counterparty associated with payroll event (e.g., the employer or user 101), and one or more element of deposit data characterizing a payroll deposit associated with the payroll event. By way of example, the one or more elements of counterparty data may include, among other things, a counterparty identifier (e.g., an employer name, etc.), a postal address of the counterparty, and/or information identifying an counterparty type (e.g., a Standard Industrial Classification (SIC) code, a Merchant Classification Code (MCC), etc.), and the one or more elements of deposit data may include, among other things, a deposit amount, a requested deposit date, and/or identifiers of a corresponding pay period associated with the payroll event.

The elements of third-party data 140E may, for a corresponding one of the customers, such as user 101, the customer identifier of user 101 and one or more elements of governmental, judicial, regulatory, or reporting data associated with, and characterizing user 101. By way of example, the elements of third-party data 140E associated with user 101 may include one or more elements of data generated and maintained by a governmental entity (e.g., governmental data) that identifies parcels of real estate, vehicles, or other tangible properties held or owned by user 101. Additionally, or alternatively, the elements of third-party data 140E associated with user 101 may include one or more elements of data generated and maintained by a reporting entity, such as credit-bureau data that includes a credit score or data characterizing one or more credit inquiries associated with user 101 during corresponding temporal intervals. In some examples, FI computing system 130 perform operations that receive, view a secure programmatic channel of communications, one or more of the customer-specific elements of third-party data 140E maintained within customer data store 140 from one or more computing systems associated with corresponding governmental, judicial, regulatory, or reporting entities, such as, but not limited to, third-party computing system 160, in accordance with a predetermined temporal schedule, on a continuous, streaming basis, or in response to a requested generated and transmitted by FI computing system 130.

Incentive data store 142 may include structured or unstructured data records that include elements of digital content associated with targeted offers or incentives associated with corresponding merchant partners or business customers of the financial institution and additionally, or alternatively, one or more targeted offers or incentives associated with corresponding financial products or loyalty programs available for provisioning to customers by the financial institution. By way of example, when presented to user 101 by client device 102 within a digital interface, the elements of digital content identify corresponding ones of the targeted offers or incentives and prompt user 101 to provide additional input to client device 102 that accepts, or alternatively, declines, the corresponding ones of the targeted offers or incentives. In some examples, FI computing system 130 perform operations that receive, view a secure programmatic channel of communications, one or more of the elements of digital content associated with the targeted offers or incentives from computing systems associated with, or operated by, corresponding ones of the merchants, such as merchant system 110, in accordance with a predetermined temporal schedule, on a continuous, streaming basis, or in response to a requested generated and transmitted by FI computing system 130.

For instance, the targeted offers or incentives may include, but are not limited to, an offer for a discount on an additional purchase of a product or service at merchant 111 or another merchant or retailer having a relationship with the financial institution, or an incentive to enroll in a loyalty or rewards program associated with merchant 111 (e.g., an additional discount on the initiated purchase transaction, a provisioning of a predetermined number of bonus points, etc.). Further, in some instances, the one or more targeted offers or incentives may include, among other things, an offer to apply for a particular financial product, such as a home mortgage, of potential interest to user 101 in accordance with corresponding, customer-specific terms and conditions, or an incentive to apply for a travel-related credit card issued by the financial institution in accordance with corresponding, customer-specific terms and conditions, such as a provisioning of additional rewards points to user 101 when the travel-related credit card funds purchase specific products, or transactions involving specific merchants, during a predetermined temporal period. Further, in some instances, the structured or unstructured data records of incentive data store 142, including the elements of external incentive data 142A and internal incentive data 142B, may store corresponding ones of the elements of digital content in conjunction with one or more elements of layout data, which specify a disposition of the elements of digital content, or visual characteristics of the elements of digital content, when rendered for presentation within a corresponding digital interface by one or more application programs executed by client device 102.

Further, and to facilitate the performance of any of the exemplary processes described herein, FI computing system 130 may also maintain, within the one or more tangible, non-transitory memories, an application repository 144 that maintains, but is not limited to, a decomposition engine 146, an analytical engine 148, and a notification engine 150, each of which may be executed by the one or more processors of server 132.

For example, and upon execution by the one or more processors of FI computing system 130, executed decomposition engine 146 may perform any of the exemplary processes described herein to obtain field mapping data 138A from mapping data store 138, to apply field mapping data 138A to a received, obtained, or intercepted RFP message associated with a corresponding payroll event involving a customer of the financial institution, and based on the application of field mapping data 138A to the RFP message, to decompose the RFP message and obtain elements of decomposed message data that identify and characterize the customer (e.g., user 101), a counterparty to the payroll event (e.g., an employer of user 101, which initiates the corresponding payment transaction), and the corresponding payroll event. Further, and upon execution by the one or more processors of FI computing system 130, executed analytical engine 148 may perform any of the exemplary processes described herein to generate elements of recommendation data that, among other things, identify and characterize financial products, financial services, or purchase transactions of potential interest to user 101 based on demographic-, payroll-, account- or transaction-based similarities between the customer and the additional customers of the financial institution associated with a customer peer group.

Upon execution by the one or more processors of FI computing system 130, notification engine 150 may perform any of the exemplary processes described herein to package elements of digital content characterizing one or more targeted offers or incentives associated with each, or a selected subset, of the recommended financial products, financial services, or purchase transactions into corresponding portions of a customer notification, and to cause FI computing system 130 to transmit the customer notification across communications network 120 to client device 102 in real-time and contemporaneously with an occurrence of a corresponding payroll event and a receipt of a corresponding RFP message.

B. Computer-Implemented Processes for Provisioning Targeted Digital Content in Based on Decomposed, Structured Messaging Data As described herein, a customer of a financial institution, such as user 101, may receive a payment for wages earned or accrued during a corresponding payroll period in accordance with a predetermined temporal schedule, e.g., on a daily basis, a weekly basis (e.g., each Friday), on a semi-monthly basis (e.g., on the 15$^{th}$ and 30$^{th}$ days of each month), or on a monthly basis (e.g., on the 30$^{th}$ day of each month). In some instances, each of the regular payments of wages to user 101 by the employer (e.g., in accordance with the predetermined temporal schedule) may correspond to, and may establish, an occurrence of a payroll event involving user 101 and initiated by the employer (e.g., a counterparty to the payroll event). In some instances, the employer, or a payroll provider of the employer, may generate, and provision to the customer, a check in an amount consistent with the wages, and the customer may deposit that check into a corresponding account at the financial institution, e.g., via person interaction at a branch of the financial institution or via interactions with mobile banking application 108 executed by processor 104 of client device 102. Additionally, or alternatively, the employer's financial institution, or the payroll provider, may initiate an electronic transfer of funds from an account of the employer, to an account of user 101 maintained by the financial institution, in an amount consistent with the wages and in accordance with the predetermined temporal schedule, e.g., via an automated clearinghouse (ACH) direct deposit.

Although the user 101 may present the physical check for deposit within the customer account at the financial institution on a corresponding business day, one or more check-clearing processes implemented by the financial institution, and by a financial institution of the employer often delay an availability of all, or at least a portion of the funds, within the customer account for up to two business days, and in some instances, up to five business days. Further, payment processing networks that clear and settle initiated electronic transfers of funds, including ACH direct deposits, between the account at the employer's financial institution and the customer account may also be associated with processing period ranging from one to three business days, depending on a time at which the employer's financial institution, or the employer's initiated electronic transfer of funds or the ACH direct deposit (e.g., prior to, or subsequent to, a processing cutoff time during each business day).

By way of example, user 101 may be an employee of Josh's Auto Service, which may agree to provision wages in an amount of $6,500.00 to user 101 on a monthly basis, e.g., on the thirtieth day of each month. In some instances, on May 30, 2022 (e.g., in accordance with the predetermined temporal schedule), one or more computing systems associated with, or operated by, the employee's financial institution (or the employee's payroll provider) may initiate a payroll event associated with the provisioning of monthly wages in the amount of $6,500.00 to user 101. Rather than provisioning a physical check to user 101 for the $6,500 monthly wages, or initiating a ACH direct deposit of funds consistent with the $6,500.00 in monthly wages to the account of user 101, the one or more computing systems of the employer's financial institution (or the employer's payroll provider) may perform processes, described herein, on May 30, 2022, to generate a request-for-payment (RFP) message that is structured and formatted in accordance with one or more elements of field mapping data (e.g., the elements of field mapping data 138A described herein), and that requests a payment to user 101 in an amount consistent with the monthly wages (e.g., the $6,500.00 in monthly wages earned or accrued in May, 2022) not at a close of a corresponding or subsequent business or calendar day, but instead in real-time and contemporaneously with the initiation of the payroll event on May 30, 2022. As described herein, the RFP message 202 may be structured in accordance with the ISO 20022 standard for electronic data exchange between financial institutions, and in some examples, the RFP message may correspond to a pain.013 message as specified within the ISO 20022 standard, and as described herein, the one or more elements of field mapping data may characterize a structure, composition, or format of one or more data fields of ISO-20002-compliant RFP message 202 (e.g., the one or more data fields within the pain.013 message).

By way of example, the ISO-20022-compliant RFP message may include among other things: (i) message fields populated with data specifying a full name and postal address of the employer of user 101 (e.g., Josh's Auto Service) and of user 101; (ii) message fields populated with data identifying a financial services account selected by the employer to fund the monthly payment of wages to user 101; (iii) message fields populated with data identifying a financial services account held by user 101 and available to receive proceeds from the requested, real-time payment; and (v) message fields populated with a requested payment date (e.g., May 30, 2022) and one or more parameter values that characterize the monthly payment of wages, such as a payment amount (e.g., $6,500.00) and a corresponding currency that denominates the payment amount. Further, ISO-20022-compliant RFP message 202 may also include one or more structured or unstructured message fields that specify additional information associated with the requested payment transactions. Examples of the additional information include, but are not limited to, a link to formatted paystub data associated with the monthly payment of wages (e.g., a link to a PDF or HTML paystub identifying the employer, the employer's postal address, a gross pay for the corresponding monthly pay period, and one or more deductions from that gross pay, e.g., due to withholding taxes, etc.). In some instances, as described herein, the link may include a long-form uniform resource locator (URL) into which certain elements of positional data may be embedded, such as, but not limited to, the actual postal code of the employer or the unique employee identifier of user 101. In other instances, the link may include a shortened URL, such as a tiny URL, actionable by FI computing system 130 using any of the exemplary processes described herein.

In some examples, the one or more computing systems of the employer's financial institution (or the employer's payroll provider) may perform operations that broadcast the populated RFP message across communications network 120 to one or more computing systems or devices within environment 100 that are associated with participants in the RTP ecosystem, such as, but not limited to, FI computing system 130 or client device 102. For example, the one or more computing systems of the employer's financial institution (or the employer's payroll provider) may broadcast populated RFP message across network 120 directly to FI computing system 130, although in other examples, the one or more computing systems of the employer's financial institution (or the employer's payroll provider) may broadcast the populated RFP message across network 120 to one or more intermediate computing systems, such as, but not limited to, one or more computing systems associated with a clearinghouse. Further, in some instances, and prior to broadcasting the populated RFP message across communications network 120, the one or more computing systems of the employer's financial institution (or the employer's payroll provider) may perform operations that encrypt the populated RFP message using a corresponding encryption key, and examples of the corresponding encryption key include, but are not limited to, a public cryptographic key associated with FI computing system 130.

Figure 2A:
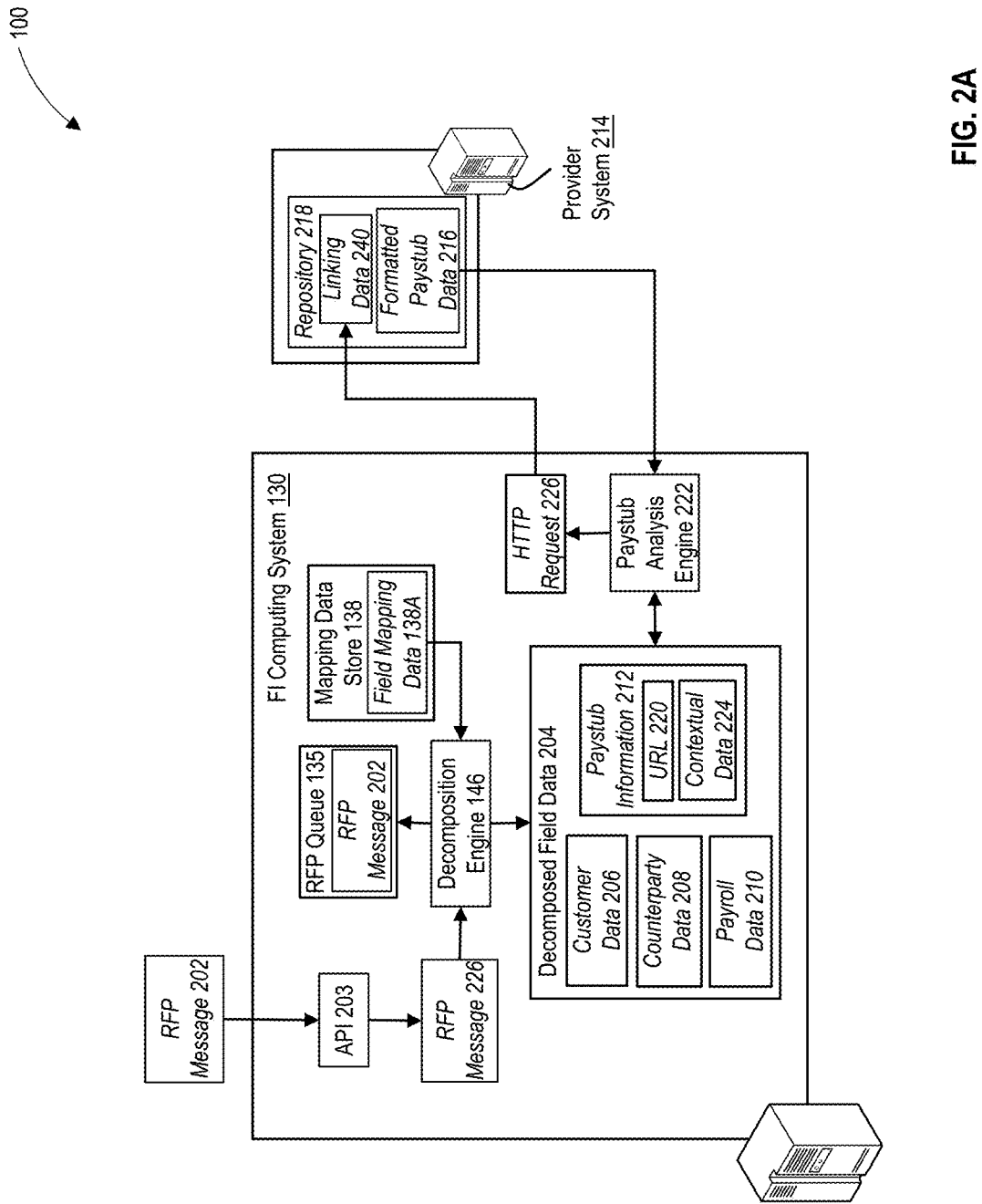
FIG. 2A is a block diagram illustrating a portion of an exemplary computing environment, in accordance with some exemplary embodiments.

Referring to FIG. 2A, a programmatic interface established and maintained by FI computing system 130, such as application programming interface (API) 203, may receive the populated RFP message, e.g., RFP message 202, and may route RFP message 202 to a decomposition engine 146 executed by the one or more processors of FI computing system 130. As described herein, FI computing system 130 may receive RFP message 202, which may request the real-time payment of the $6,500.00 in monthly wages to user 101 on May 30, 2022, directly from the one or more computing systems of the employer's financial institution (or the employer's payroll provider), or from the one or more intermediate computing systems, across a programmatically established channel of communications. In some examples, one or more portions of RFP message 202 may be encrypted (e.g., using a public cryptographic key associated with FI computing system 130), and executed decomposition engine 146 may perform operations that access a corresponding decryption key maintaining within the one or more tangible, non-transitory memories of FI computing system 130 (e.g., a private cryptographic key associated with FI computing system 130), and that decrypt the encrypted portions of RFP message 202 using the corresponding decryption key. In some instances, executed decomposition engine 146 may store RFP message 202 (in decrypted form) within a corresponding portion of data repository 134, e.g., within RFP message queue 135.

As described herein, RFP message 202 may request a real-time payment to user 101 of $6,500.00 in monthly wages earned by user 101 as an employee of Josh's Auto Service during the month of May 2022. Further, RFP message 202 may be structured in accordance with the ISO 20022 standard for electronic data exchange between financial institutions, and in some instances, RFP message 202 may correspond to a pain.013 message as specified within the ISO 20022 standard. By way of example, and referring to FIG. 2B, RFP message 202 may include message field 228 populated with a formatted payment date of May 30, 2022 (e.g., "2022-05-30"), and message fields 230 populated with respective ones of a formatted payment amount (e.g., "6,500.00") and a formatted payment currency (e.g., "USD").

RFP message 202 may also maintain, within corresponding ones of message fields 232, a formatted name of the employer of user 101 (e.g., "Josh's Auto Service") and selected portions of a formatted postal address of the employer (e.g., "14806 Crain Highway, Brandywine, Maryland, 20613"), and may maintain, within message field 234, a formatted identifier of a financial services account selected by the employer to fund the $6,500.00 payment to user 101 (e.g., an account number "XXXX-1234-5678-9012" of a business checking account held by the employer). Further, as illustrated in FIG. 2B, message fields 236 of RFP message 202 may be populated, respectively, with a formatted name of user 101 (e.g., "John Q. Stone") and selected portions of a formatted postal address of user 101 (e.g., "2223 Eye Street NW, Washington, D.C., 20037, US"). RFP message 202 may also maintain, within message field 238, a formatted identifier of a financial services account held by user 101 and capable of receiving proceeds from the $6,500.00 payment (e.g., an account number "XXXX-9012-3456-7890" of a deposit account held by user 101 at the financial institution).

In some instances, RFP message 202 may also include one or more message fields that specify structured, or unstructured, paystub information associated with the $6,500.00 payment to user 101 for the wages earned while employed by Josh's Auto Service during May 2022, such as, but not limited to, a link to paystub data in PDF or HTML format that identifies the employer or the employer's postal address, and that includes contextual data characterizing a gross pay associated with May 2022 and one or more deductions from that gross pay (e.g., tax withholding, pretax deductions, etc.). As described herein, the link may include a long-form or shortened URL associated with formatted paystub data, e.g., that points to the storage location of formatted paystub data within a data repository maintained by one or more computing systems associated with the payroll provider.

For example, message field 244 of RFP message 202 may be populated with a long-form URL (e.g., www.example-.com/receipt?custid='1234'?zip='20613'), which includes an actual postal code of the employer of user 101 (e.g., "20613") and a unique employee identifier of user 101 (e.g., "1234"). The disclosed embodiments are, however, not limited to RFP messages populated with these exemplary formatted elements of data or elements of structured or unstructured information, and in other examples, RFP message 202 may include any additional, or alternate, message fields specified within field mapping data 138A and consistent with the ISO 20022 standard for electronic data exchange, and the additional, or alternate, message fields may be populated with any additional, or alternate, formatted elements of data, or elements of structured or unstructured information, appropriate to RFP message 202 and field mapping data 138A.

Referring back to FIG. 2A, executed decomposition engine 146 may perform operations that access mapping data store 138 (e.g., as maintained within data repository 134), and obtain one or more elements of field mapping data 138A that characterize the structure, composition, or format of one or more data fields of RFP message 202 (e.g., the message fields consistent with the ISO 20022 standard for electronic data exchange between financial institutions). Based on the obtained elements of field mapping data 138A, executed decomposition engine 146 may perform any of the exemplary processes described herein to that parse RFP message 202 and obtain elements of decomposed field data 204 that identify and characterize user 101, the employer of user 101, and the request of the real-time payment of the $6,500.00 in monthly wages to user 101 on May 30, 2022. In some instances, and through the performance of these exemplary operations, executed decomposition engine 146 may "decompose" the structured or unstructured data populating the message fields of RFP message 202 in accordance with field mapping data 138A, and generate the elements of decomposed field data 204 that include, but are not limited to, one or more elements of customer data 206, counterparty data 208, payroll data 210, and paystub information 212.

By way of example, and based on the elements of field mapping data 138A, executed decomposition engine 146 may determine that message fields 236 of RFP message 202 include data that identifies and characterizes user 101, and may perform operations that obtain the customer name of user 101 (e.g., "John Q. Stone") and the postal address associated with user 101 (e.g., "2223 Eye Street NW, Washington, D.C., 20037, US") from message fields 232 of RFP message 202, and that package the obtained customer name and postal address into corresponding portions of customer data 206 of decomposed field data 204. Additionally, and based on the elements of field mapping data 138A, executed decomposition engine 146 may determine that message fields 232 of RFP message 202 includes data identifying and characterizing the employer of user 101, and may perform operations that obtain the name of the employer (e.g., "Josh's Auto Service") and the postal address associated with the employer (e.g., "14806 Crain Highway, Brandywine, Maryland, 20613, US") from message fields 232, and that package the obtained name and postal address of the employer of user 101 into corresponding portions of counterparty data 208 within decomposed field data 204.

In some instances, and based on the elements of field mapping data 138A, executed decomposition engine 146 may determine that one or more additional message fields of RFP message 202 include elements of data identifying and characterizing the requested payment, such as, but not limited to; message field 228, which includes the requested payment date (e.g., "May 30, 2022"); message fields 230, which includes data identifying the payment amount of the requested payment (e.g., $6,500.00) and the requested payment currency (e.g., "USD"); message field 234, which includes the formatted identifier of the financial services account selected by the employer to fund the $6,500.00 payment to user 101 (e.g., an account number "XXXX-1234-5678-9012" of a business checking account held by the employer); and message field 238, which includes the formatted identifier of the financial services account held by user 101 and capable of receiving proceeds from the $6,500.00 payment (e.g., an account number "XXXX-9012-3456-7890" of a deposit account held by user 101 at the financial institution). Executed decomposition engine 146 may perform operations that extract the payment amount, the account identifiers, and the requested payment date from corresponding ones of message fields 228, 230, 234, and 238, and that package the extracted payment amount, the account identifiers of the financial services account selected by the employer of user 101 and the financial services account held by user 101, and the requested payment date into corresponding portions of payroll data 210 of decomposed field data 204.

Further, executed decomposition engine 146 may also determine, based on the elements of field mapping data 138A, that message field 244 of RFP message 202 includes structured or unstructured elements of paystub data that characterizes further the characterized requested, real-time payment of the $6,500.00 in monthly wages to user 101 on May 30, 2022, and in some instances, user 101 or the employer of user 101. Executed decomposition engine 146 may obtain the structured or unstructured elements of paystub data from message field 244 of RFP message 202 and package the obtained elements of paystub data into corresponding portions of paystub information 212 of decomposed field data 204. In some instances, the elements of structured or unstructured paystub data may include a link (e.g., a shortened or tiny URL, a long-form URL, etc.) to formatted paystub data associated with the requested payment and maintained within one or more computing systems associated with a payroll provider of the employer of user 101, such as, but not limited to, provider system 214.

Provider system 214 may include one or more servers and one or more tangible, non-transitory memory devices storing executable code, application engines, or application modules. Each of the one or more servers may include one or more processors, which may be configured to execute portions of the stored code, application engines, or application modules to perform operations consistent with the disclosed exemplary embodiments. In some instances, provider system 214 may correspond to a discrete computing system, although in other instances, provider system 214 may correspond to a distributed computing system having multiple, computing components distributed across an appropriate computing network, such as communications network 120, or those established and maintained by one or more cloud-based providers, such as Microsoft Azure™, Amazon Web Services™, or another third-party, cloud-services provider. Further, provider system 214 may also include one or more communications units, devices, or interfaces, such as one or more wireless transceivers, coupled to the one or more processors for accommodating wired or wireless internet communication across network 120 with other computing systems and devices operating within environment 100 (not illustrated in FIG. 2A).

Referring back to FIG. 2A, the paystub data may include a long-form URL (e.g., www.example.com/receipt?custid='1234'?zip='20613), that points to formatted paystub data 216 maintained within the one or more tangible, non-transitory memories of provider system 214, such as within data repository 218, and that includes, among other things, the actual postal code of the employer of user 101 (e.g., "20613") and the employee identifier of user 101 (e.g., "1234"), which the employer may assign to user 101. Executed decomposition engine 146 may obtain the shortened or long-form link from message fields of RFP message 202, and package the shortened or long-form link into paystub information 212, e.g., as URL 220. Further, executed decomposition engine 146 may also perform operations that programmatically trigger an execution of a paystub analysis engine 222 by the one or more processors of FI computing system 130.

In some instances, upon execution by the one or more processors of FI computing system 130, executed paystub analysis engine 222 may perform operations that, based on URL 220 maintained within paystub information 212 of decomposed field data 204, programmatically access elements of formatted paystub data 216 maintained at provider system 214, and that process the accessed elements of formatted paystub data 216 to obtain additional, or alternate, elements of customer data 206, counterparty data 208, payroll data 210, and additionally, or alternatively, one or more elements of contextual data 224 that further characterizes the requested, real-time payment of the $6,500.00 in monthly wages to user 101 on May 30, 2022. Examples of the elements of contextual data 224 may include, but are not limited to, an actual postal address of the employer, a corresponding pay period associated with the requested, real-time payment of the $6,500.00 in monthly wages (e.g., a monthly pay period from May 1, 2022, to May 31, 2022), an amount of gross wages during the corresponding pay period, and certain deductions from that gross pay during the corresponding pay period, such as those due to government withholding, healthcare, or other pre-tax deductions.

By way of example, paystub analysis engine 222 may access URL 220 maintained within paystub information 212 (e.g., long-form URL www.example.com/receipt?custid='1234'?zip='20613," as described herein, etc.), and may process URL 220 and generate a corresponding HTTP request 226 for the elements of formatted paystub data 216 maintained at provider system 214. Executed paystub analysis engine 222 may also perform operations that cause FI computing system 130 to transmit HTTP request 226 across network 120 to provider system 214.

Provider system 214 may, for example, receive HTTP request 226, and based on portions of HTTP request 226 and linking data 240 maintained within data repository 218 (e.g., based on a determined match or correspondence between the portions of HTTP request 226 and linking data 240), provider system 214 may perform operations that obtain the elements of formatted paystub data 216 from data repository 218, and that transmit the elements of formatted paystub data 216 across network 120 to FI computing system 130, e.g., as a response to HTTP request 226. Further, as illustrated in FIG. 2A, executed paystub analysis engine 222 may receive the elements of formatted paystub data 216 from provider system 214, and may perform any of the exemplary processes described herein to parse the elements of formatted paystub data 216 (e.g., in a received format, such as a PDF or HTML form, or in a transformed or enhanced format, etc.) and obtain, from the parsed elements of formatted paystub data 216, one or more of the additional, or alternate, elements of customer data 206, counterparty data 208, or payroll data 210, and in some instances, one or more elements of contextual data 224. By way of example, executed paystub analysis engine 222 may apply one or more optical character recognition (OCR) processes or optical word recognition (OWR) processes to the elements of formatted paystub data 216 in PDF form to generate, or obtain, elements of textual content that characterizes user 101, the employer of user 101, and the requested real-time payment of the $6,500.00 in monthly wages to user 101 on May 30, 2022.

By way of example, executed paystub analysis engine 222 may perform operations that detect a presence of one or more keywords within the generated elements of textual content (e.g., "pay period," "depart," "gross," "net," "withholding," "deduction," etc.), and may extract elements of the textual content associated with these keywords as corresponding ones of the additional, or alternate, elements of customer data 206, counterparty data 208, payroll data 210, and/or corresponding ones of the elements of contextual data 224. In other examples, executed paystub analysis engine 222 may detect a presence of the additional, or alternate, elements of customer data 206, counterparty data 208, payroll data 210, and/or contextual data 224 within the generated textual content based on an application of one or more adaptively trained machine learning or artificial intelligence processes to portions of the textual content, and examples of these adaptively trained machine learning or artificial intelligence processes include a trained neural network process (e.g., a convolutional neural network, etc.) or a decision-tree process that ingests input datasets composed of all, or selected portions, of the textual content. The disclosed embodiments are, however, not limited to exemplary processes for detecting and extracting one or more of the additional, or alternate, elements of customer data 206, counterparty data 208, or payroll data 210, and in some instances, one or more elements of contextual data 224, from the generated textual content, and in other instances, executed paystub analysis engine 222 may perform any additional, or alternate, process for identifying one or more of the additional, or alternate, elements of customer data 206, counterparty data 208, or payroll data 210, of the elements of contextual data 224, within the textual content derived from the processing of the elements of formatted paystub data 216 in PDF format.

Further, and as described herein, the elements of formatted paystub data 216 may be structured in HTML form, and may include metadata that identify and characterize user 101 (e.g., the customer name, etc.), the employer of user 101 (e.g., the employer name or other employer identifier, etc.) and the request of the real-time payment of the $6,500.00 in monthly wages to user 101 on May 30, 2022 (e.g., the payment amount, the payment date, the corresponding pay period associated with the requested, real-time payment of the $6,500.00 in monthly wages (e.g., a monthly pay period from May 1, 2022, to May 31, 2022), the amount of gross wages during the corresponding pay period, and certain deductions from that gross pay during the corresponding pay period, etc.). Executed paystub analysis engine 222 may perform operations that detect one or more of the elements of metadata within the elements of formatted paystub data 216, and that obtain, from the elements of metadata, additional, or alternate, elements of customer data 206, counterparty data 208, payroll data 210, or paystub information 212 (including contextual data 224), as described herein. The disclosed embodiments are, however, not limited to these exemplary processes for detecting and extracting the additional, or alternate, elements of elements of customer data 206, counterparty data 208, or payroll data 210, or contextual data 224 from HTML-formatted receipt data, and in other instances, executed paystub analysis engine 222 may perform any additional, or alternate, process detecting and obtaining data from the elements of formatted paystub data 216 structured in HTML form, including, but not limited to, an application of one or more screen-scraping processes to formatted paystub data 216 structured in HTML form.

By way of example, executed paystub analysis engine 222 may perform any of the exemplary operations described herein to process the elements of formatted paystub data 216, structured in PDF or HTML form, and extract one or more of the elements of contextual data 224 that further characterize the requested real-time payment of the $6,500.00 in monthly wages to user 101 on May 30, 2022. As described herein, the extracted elements of contextual data 224 may include, but are not limited to, the corresponding pay period associated with the requested payment of wages (e.g., a month-month pay period ranging from May 1, 2022, to May 31, 2022), the gross pay of $8,300.00 during the corresponding pay period, a specified number of four exemptions for purposes of tax withholding, and one or more of the deductions from the gross pay, include $1,200.00 in taxes withheld and $600.00 withheld for health insurance. Executed paystub analysis engine 222 may perform operations that store the elements of contextual data 224 within a portion of paystub information 212.

In some instances, executed decomposition engine 146 may perform operations that store decomposed field data 204, which include the elements of customer data 206, counterparty data 208, payroll data 210, and paystub information 212 (including URL 220 and contextual data 224), within a corresponding portion of data repository 134 (not illustrated in FIG. 2A), and may provide decomposed field data 204 as an input to analytical engine 148 of FI computing system 130. Upon execution by the one or more processors of FI computing system 130, executed analytical engine 148 may perform any of the exemplary processes described herein to generate elements of recommendation data that, among other things, identify and characterize financial products, financial services, or purchase transactions of potential interest to user 101 based on demographic-, payroll-, account- or transaction-based similarities between user 101 and the additional customers of the financial institution associated with a customer peer group, and provide targeted offers or incentives that prompt user 101 to acquire one or more of the financial products, access one or more of the financial services, or initiate one or more of the purchase transactions of potential interest. Examples of these targeted offers or incentives may include, but are not limited to, one or more of the exemplary merchant-, customer-, and/or loyalty-based offers or incentives described herein.

Figure 2C:
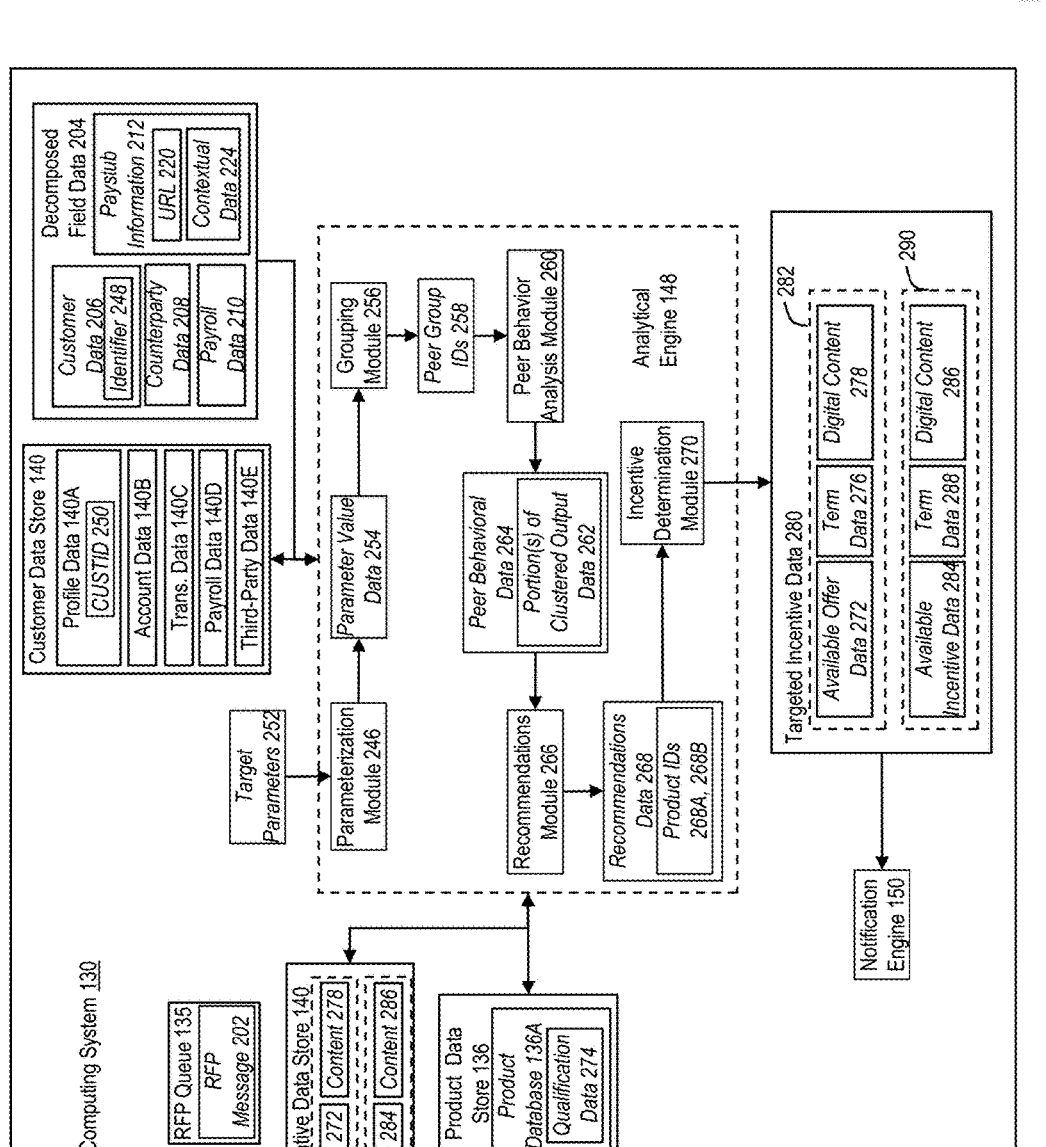
FIGS. 2C and 3 are block diagrams illustrating portions of an exemplary computing environment, in accordance with some exemplary embodiments.

Referring to FIG. 2C, a parameterization module 246 of executed analytical engine 148 may access the elements of customer data 206, counterparty data 208, payroll data 210, and paystub information 212 (including contextual data 224) maintained within decomposed field data 204. For example, customer data 206 may include a unique identifier 248 of user 101, such as customer name (e.g., "John Q. Stone"), and executed parameterization module 246 may access the elements of customer profile data 140A maintained within customer data store 140, and may determine that identifier 248 of customer data 206 is associated with a unique, alphanumeric customer identifier 250 assigned to user 101 by the financial institution (e.g., an alphanumeric character string "CUSTID"). In some instances, executed parameterization module 246 may also perform operations that access one or more of the elements of customer profile data 140A, account data 140B, transaction data 140C, payroll data 140D, and third-party data 140E (e.g., the elements of credit bureau data or governmental data described herein).

In some instances, executed parameterization module 246 may also obtain, from the one or more tangible, non-transitory memories of FI computing system 130, data identifying one or more target demographic, account, transactional, and payroll parameters, e.g., target parameters 252 of FIG. 2C. By way of example, target parameters 252 may include one or more demographic parameters such as a city of residence or an age of a customer, and one or more account parameters such as a time-averaged value of deposits into, or withdrawals from, one or more specified types of accounts maintained at the financial institution (e.g., savings, checking, or other deposit accounts, etc.). Target parameters 252 may also include one or more transaction parameters, such as a time-averaged or aggregate spend (e.g., an average amount of daily spend across all transactions), a time-averaged spend at certain types of merchants (e.g., merchants characterized by a common SIC code, such as airlines), a time-averaged spend involving certain types of products (e.g., groceries, travel-related products, such as airline tickets, hotel reservations, etc.), and/or a time-averaged spend at a particular merchant (e.g., a merchant partner of the financial institution, such as merchant 111).

Further, target parameters 252 may also include one or more payroll parameters, such as an expected date for RTP-based payroll deposits from the employer (e.g., every Friday, the $14^{th}$ or $30^{th}$ of each month, etc.) and time-averaged values of these RTP-based payroll deposits (e.g., an average daily deposit across multiple prior months). In some instances, and in addition to specifying a corresponding one of the target demographic, account, transactional, and payroll parameters, target parameters 252 may also specify ranges of values for one or more of the target demographic, account, transactional, and payroll parameters, which may bracket customer-specific values of corresponding ones of the demographic, account, transactional, and payroll. By way of example, target parameters 252 may include a customer age, and may bracket the customer ages into age ranges that include, but are not limited to, ages between zero and eighteen, ages between nineteen and twenty-five, ages between twenty-six and thirty-four, ages between thirty-five and forty-four, ages between forty-five and fifty-nine, and ages of sixty and above. Further, in some examples, target parameters 252 may also include an average monthly spend on groceries, and may bracket the average monthly spend into brackets of average monthly spend that include, but are not limited, an average monthly spend of less than $80.00, an average monthly spend between $80.00 and $120.00, an average monthly spend between $120.00 and $160.00, an average monthly spend between $160.00 and $200.00, and an average monthly spend in excess of $200.00. The disclosed embodiments are, however, not limited to these exemplary target demographic, account, transactional, and payroll parameters, or to these exemplary brackets of parameter ranges, and in other examples, target parameters 252 may identify any additional, or alternate, target demographic, account, transactional, and payroll parameter associated with a discrete parameter values, or with corresponding brackets of parameter ranges, that would be appropriate to RFP message 202 or to the elements of decomposed field data 204.

Referring back to FIG. 2C, based on the accessed elements of customer data 206, counterparty data 208, payroll data 210, and paystub information 212, and based on the accessed of customer profile data 140A, account data 140B, transaction data 140C, payroll data 140D, and third-party data 140E associated with user 101, executed parameterization module 246 may determine a parameter value, or a corresponding range of parameter values ranges, for each of the target demographic, account, transactional, and payroll parameters of user 101 included within target parameters 252. In some instances, executed parameterization module 246 may package each of the determined parameter values and/or determined bracket of parameter value ranges into corresponding portions of parameter value data 254, along with information identifying corresponding ones of the target demographic, account, transactional, and payroll parameters.

By way of example, and based on the accessed elements of customer profile data 140A, executed parameterization module 246 may establish that user 101 is a forty-four-year-old resident of Philadelphia, Pennsylvania, and further, that the established age of user 101 is disposed within the age range extending from twenty-six to thirty-four years of age (e.g., as specified within target parameters 252). In some instances, executed parameterization module 246 may package the established customer age range (e.g., extending from twenty-six to thirty-four years) and the established customer residence (e.g., Philadelphia, Pennsylvania) into corresponding portions of parameter value data 254, along with data identifying corresponding ones of the demographic parameters (e.g., the customer age and the customer residence). Further, and based on the accessed elements of payroll data 140D and payroll data 210, executed parameterization module 246 may establish an expectation that user 101 will receive RTP-based payroll deposits from the employer on the thirtieth day of each month, and that an average daily balance in a deposit account held by user 101 corresponds to $225.00. Executed parameterization module 246 may also package the expected date of RTP-based payroll deposits (e.g., the thirtieth day of each month) and the average daily balance in the deposit account (e.g., $225.00) into corresponding portions of parameter value data 254, along with data identifying corresponding ones of the payroll parameter (e.g., the expected date of RTP-based payroll deposits) and the account parameter (e.g., the average daily balance in the deposit account).

Further, in some examples. based on the accessed elements of transaction data 140C, executed parameterization module 246 may establish that an average monthly spending of user 101 on groceries corresponds to $103.00, and that the established average monthly spending is disposed within the spending range extending from $80.00 to $120.00 (e.g., as specified within target parameters 252). In some instances, executed parameterization module 246 may package the established spending range (e.g., extending from $80.00 to $120.00) into a corresponding portion of parameter value data 254, along with data identifying the corresponding transaction parameter (e.g., the average monthly spending on groceries). Executed parameterization module 246 may perform similar operations that determine a value, or a corresponding range of values that characterize each additional, or alternate, one of the target demographic, account, transactional, and payroll parameters included within target parameters 252, and to package the determined value or range of values into a corresponding portion of parameter value data 254. In some instances, not illustrated in FIG. 2C, executed parameterization module 246 may perform operations that store parameter value data 254 within a corresponding portion of data repository 134.

Referring back to FIG. 2C, executed parameterization module 246 may provide the elements of parameter value data 254 as an input to a grouping module 256 of executed analytical engine 148. Upon execution by the one or more processors of FI computing system 130, executed grouping module 256 may access the elements of customer profile data 140A, account data 140B, transaction data 140C, payroll data 140D, and third-party data 140E maintained within customer data store 140. Further, and based on the accessed elements of customer profile data 140A, account data 140B, transaction data 140C, payroll data 140D, and third-party data 140E, executed grouping module 256 may also identify one or more of additional customers of the financial institution associated with values of one or more of the target demographic, account, transactional, and payroll parameters that are similar to corresponding parameter values associated with user 101 and maintained within corresponding portions of parameter value data 254. For instance, a value of one of the target demographic, account, transactional, and payroll parameters that characterizes one of the additional customers may be similar to a corresponding parameter value that characterizes user 101 when the parameter value is equivalent to the corresponding parameter value, when parameter value falls within a predetermined, threshold amount of the corresponding parameter value, or when the parameter value is disposed within a specified value range that includes the corresponding parameter value.

By way of example, each of the additional customers may be characterized by a customer age that falls between twenty-six to thirty-four years of age (e.g., the customer age bracket associated with user 101), may reside in Philadelphia, Pennsylvania, may be associated with an expected receipt of RTP-based payroll deposits from a corresponding employer on the thirtieth day of each month, may be associated with an average daily balance in a deposit account of $220.00 (e.g., within a predetermined threshold amount, such as 5%, of the $225.00 average daily balance associated with user 101), and additionally, or alternatively, may be associated with an average monthly spend on groceries that ranges from $80.00 to $120.00 (e.g., the spend backer associated with user 101). As described herein, the identified, additional customers may establish collectively a "customer peer group" for user 101, and in some instances, executed grouping module 256 may perform operations that package a unique customer identifier associated with each of the identified, additional customers of the customer peer group (e.g., a unique, alphanumeric identifier assigned by the financial institution, which identifies the corresponding customers within customer data store 140) into a corresponding portion of peer group identifiers 258, which executed grouping module 256 may provide as input to a peer behavioral analysis module 260 of executed analytical engine 148.

In some instances, upon execution by the one or more processors of FI computing system 130, executed peer behavioral analysis module 260 may perform operations that, based on the elements of customer profile data 140A, account data 140B, transaction data 140C, payroll data 140D, and third-party data 140E associated with the customer peer group, perform operations that derive insights characterizing one or more transactional- or product-specific habits or behaviors of the additional customers of the customer peer group during a current temporal interval, or over one or more prior temporal intervals. By way of example, and based on corresponding ones of the peer group identifiers 258 (e.g., that identify corresponding ones of the additional customers of the customer peer group), executed peer behavioral analysis module 260 may access elements of customer profile data 140A, account data 140B, transaction data 140C, payroll data 140D, and third-party data 140E associated with each of the additional customers of the peer customer group.

Further, and based on the accessed elements of customer profile data 140A, account data 140B, transaction data 140C, payroll data 140D, and third-party data 140E associated with each of the additional customers, executed peer behavioral analysis module 260 may perform operations that identify patterns characterizing one or more transactional- or product-specific habits or behaviors of the additional customers of the customer peer group during a current temporal interval, or over one or more prior temporal intervals, and that package data characterizing the identified patterns in the transactional- or product-specific habits or behaviors of the additional customers into corresponding portions of peer behavioral data 264. By way of example, executed peer behavioral analysis module 260 may obtain, from the one or more tangible non-transitory memories of FI computing systems 130, elements of process parameter data that identify and characterizes a trained machine-learning or artificial-intelligence process, and that include values of one or more process parameters of the trained machine-learning or artificial-intelligence process. By way of example, the elements of process parameter data may identify and characterize an unsupervised machine-learning processes, such as a clustering process, and examples of these clustering processes include, but are not limited to, a k-means clustering process, a DBSCAN clustering process, a Gaussian Mixture Model (GMM) process, and/or a BIRCH process.

In some instances, executed peer behavioral analysis module 260 may perform operations that apply one or more of the exemplary clustering processes described herein to the accessed elements of customer profile data 140A, account data 140B, transaction data 140C, payroll data 140D, and third-party data 140E associated with each of the additional customers of the customer peer group. Based on the application of the clustering process to the accessed elements of customer profile data 140A, account data 140B, transaction data 140C, payroll data 140D, and third-party data 140E, executed peer behavioral analysis module 260 may generate elements of clustered output data 262 that identify and characterize one or more clusters of the additional customers that are associated with corresponding, and potentially overlapping, sets of transactional- or product-specific habits or behaviors. Each of the one or more clusters may be populated or associated with a corresponding number of the additional customers, and executed peer behavioral analysis module 260 may perform operations that package portions of clustered output data 262 associated with each, or a selected subset, of the clusters of the additional customers within a corresponding portion of peer behavioral data 264, which executed peer behavioral analysis module 260 may provide as an input to a recommendation module 266 of executed analytical engine 148.

By way of example, portions of clustered output data 262 packaged into peer behavioral data 264 may identify a cluster of additional customers that hold a secured credit product, such as a home mortgage product, that own a particular vehicle, such as a full-sized pickup truck, that hold a particular unsecured credit product issued by the financial institution, such as a rewards-based credit card, and that are associated with purchase transactions at a corresponding merchant or retailer, such as merchant 111, having average values that exceed a predetermined threshold value, such as $100.00. The disclosed embodiments are, however, not limited to these exemplary transactional- or product-specific habits or behaviors, and in other instances, the portions of clustered output data 262 packaged into peer behavioral data 264 may identify and characterize additional, or alternatively, clusters of additional customers associated with, and characterized by, any additional, or alternative, transactional- or product-specific habits or behaviors appropriate to the elements of customer profile data 140A, account data 140B, transaction data 140C, payroll data 140D, and third-party data 140E.

Referring back to FIG. 2C, upon execution by the one or more processors of FI computing system 130, executed recommendation module 266 may receive the peer behavioral data 264, which includes the portions of clustered output data 262 that identify and characterize one or more clusters of the additional customers associated with corresponding, and potentially overlapping, sets of transactional- or product-specific habits or behaviors. Further, executed recommendation module 266 may also perform operations that access the elements of decomposed field data 204 (e.g., the elements of customer data 206, counterparty data 208, payroll data 210, and paystub information 212) maintained within data repository 134, and may access one or more additional elements of customer profile, account, transaction, payroll, and/or third-party data maintained within customer data store 140 and associated with user 101 (e.g., corresponding elements of customer profile data 140A, account data 140B, transaction data 140C, payroll data 140D, and third-party data 140E that include or reference customer identifier 250).

Based on the elements of peer behavioral data 264, the elements of decomposed field data 204, and on the additional elements of customer profile, account, transaction, payroll, and/or third-party data associated with user 101, executed recommendation module 266 may perform operations, described herein, to generate elements of recommendations data 268 that identify and characterize financial products, financial services, or purchase transactions that may be of potential interest to user 101 (e.g., "recommended" financial products, financial services, or purchase transactions). As described herein, the recommend financial products, financial services, or purchase transactions may reflect determined, or expected, similarities between one or more transactional- or product-specific habits or behaviors of user 101 during a current temporal interval and corresponding transactional- or product-specific habits or behaviors of the additional customers of the customer peer group of user 101 during the current temporal interval, or during one or more prior temporal intervals. Further, the recommended financial products, financial services, or purchase transactions may include all, or a selected subset, of these financial products, financial services, or purchase transactions associated with one or more clusters of the additional customers specified the portions of clustered output data 262.

In some instances, executed recommendation module 266 may perform operations that identify one or more of the recommended financial products, financial services, or purchase transactions based on an application of one or more predetermined, cluster-, product-, or transaction specific rules to the portions of clustered output data 262 packaged into peer behavioral data 264, to the elements of decomposed field data 204, and/or to the additional elements of customer profile, account, transaction, payroll, and/or third-party data associated with user 101. For instance, recommendation module 266 may obtain elements of rubric data from the one or more tangible, non-transitory memories of FI computing system 130 (not illustrated in FIG. 2C), and may obtain data characterizing a predetermined, cluster-specific rule from the rubric data. For example, and based on an application of the predetermined, cluster-specific rule to peer behavioral data 264, executed recommendation module 266 may perform operations that identify the number of additional customers associated with each of the clusters associated with the portions of clustered output data 262, and that filter peer behavioral data 264 to exclude those portions of clustered output data 262 associated with corresponding numbers of additional customers that fail to exceed a threshold number of customers, or that fall below a maximum number of the associated customers.

In other examples, the portions of clustered output data 262 packaged into peer behavioral data 264 may identify the cluster of additional customers that hold a home mortgage product, that own a full-sized pickup truck, that hold a rewards-based credit card issued by the financial institution, and that are associated with purchase transactions at a corresponding merchant or retailer, such as merchant 111, that exceed a predetermined threshold value, such as $100.00. Based on one or more of the predetermined, transaction-specific rules maintained within the rubric data, executed recommendation module 266 may parse the additional elements of transaction data associated with user 101 (and additionally, or alternatively, the additional elements of third-party data associated with user 101, which may include governmental data identifying one or more vehicles owned by user 101), executed recommendation module 266 may establish that user 101 recently purchased a light pickup truck, and that an average value of purchase transactions initiated by user 101 at merchant 111 corresponds to $75.00, which fails to exceed the predetermined threshold value of $100.00. In some instances, executed recommendation module 266 may establish that purchase transactions involving the light pickup truck and merchant 111 from any recommended purchase transactions in accordance with the one or more of the predetermined, transaction-specific rules maintained within the rubric data.

Further, based on one or more of the predetermined, product-specific rules maintained within the rubric data, executed recommendation module 266 may parse the additional elements of account data associated with user 101, and executed recommendation module 266 may establish that user 101 holds neither the home mortgage product nor the rewards-based credit card that are held by the additional customers of the customer peer group of user 101, and executed recommendation module 266 may determine that the home mortgage product and the rewards-based credit card each represent recommended products in accordance with the predetermined, product-specific rules maintained within the rubric data. The disclosed embodiments are, however, not limited to these exemplary predetermined, cluster-, product-, or transaction specific rules, and in other instances, executed recommendation module 266 may iden-tify the recommended financial products, financial services, or purchase transactions based on an additional, or alternate, cluster-, product-, or transaction specific rules to the elements of peer behavioral data 264, the elements of decomposed field data 204, and on the additional elements of customer profile, account, transaction, payroll, and/or third-party data associated with user 101.

The disclosed embodiments are also not limited to processes that identify the recommended financial products, financial services, or purchase transactions based on the application of predetermined, cluster-, product-, or transaction specific rules to any portion of the elements of peer behavioral data 264, the elements of decomposed field data 204, and on the additional elements of customer profile, account, transaction, payroll, and/or third-party data associated with user 101. In other examples, executed recommendation module 266 may perform operations that apply a trained machine learning or artificial intelligence process to an input dataset obtained from, or derived from, portions of the elements of peer behavioral data 264, the elements of decomposed field data 204, and/or the additional elements of customer profile, account, transaction, payroll, and/or third-party data associated with user 101. Based on the application of the trained machine learning or artificial intelligence process to the input dataset, executed recommendation module 266 may generate one or more elements of recommendations data 268 that identifies each of the recommended financial products, financial services, or purchase transactions of potential interest to user 101.

Examples of the trained machine-learning and artificial-intelligence processes may include, but are not limited to, a clustering process, an unsupervised learning process (e.g., a k-means algorithm, a mixture model, a hierarchical clustering algorithm, etc.), a semi-supervised learning process, a supervised learning process, or a statistical process (e.g., a multinomial logistic regression model, etc.). The trained machine-learning and artificial-intelligence processes may also include, among other things, a decision tree process (e.g., a boosted decision tree algorithm, etc.), a random decision forest, an artificial neural network, a deep neural network, or an association-rule process (e.g., an Apriori algorithm, an Eclat algorithm, or an FP-growth algorithm). Further, and as described herein, each of these exemplary machine-learning and artificial-intelligence processes may be trained against, and adaptively improved using, elements of training and validation data, and may be deemed successfully trained and ready for deployment when a value of one or more performance or accuracy metrics are consistent with one or more threshold training or validation criteria.

For instance, the trained machine learning or artificial intelligence process may include a trained decision-tree process, and executed recommendation module 266 may obtain, from one or more tangible, non-transitory memories, elements of process input data and process parameter data associated with the trained decision-tree process (not illustrated in FIG. 2C). For example, the elements of process input data may characterize a composition of the input dataset for the trained decision-tree process and identify each of the discrete data elements within the input data set, along with a sequence or position of these elements within the input data set, and the elements of process parameter data may include a value for one or more parameters of the trained decision-tree process. Examples of these parameter values include, but are not limited to, a learning rate associated with the trained, decision-tree process, a number of discrete decision trees included within the trained, decision-tree process, a tree depth characterizing a depth of each of the discrete decision trees, a minimum number of observations in terminal nodes of the decision trees, and/or values of one or more hyperparameters that reduce potential process overfitting.

In some examples, not illustrated in FIG. 2C, executed recommendation module 266 may perform operations that generate one or more discrete elements (e.g., "feature values") of the input dataset in accordance with the elements of peer behavioral data 264, the elements of decomposed field data 204, and/or the additional elements of customer profile, account, transaction, payroll, and/or third-party data associated with user 101. Based on portions of the process parameter data, executed recommendation module 266 may perform operations that establish a plurality of nodes and a plurality of decision trees for the trained decision-tree process, each of which receive, as inputs (e.g., "ingest"), corresponding elements of the input dataset. Further, and the ingestion of the input dataset by the established nodes and decision trees of the trained decision-tree process, executed recommendation module 266 may perform operations that apply the trained, decision-tree process to the input dataset, and that generate the one or more elements of recommendations data 268 identifying the recommended financial products, financial services, or purchase transactions of potential interest to user 101.

Referring back to FIG. 2C, executed recommendation module 266 may provision the elements of recommendations data 268 as an input to an incentive determination module 270 of executed analytical engine 148. Upon execution by the one or more processors of FI computing system 130, executed incentive determination module 270 may receive the elements of recommendations data 268 and access incentive data store 142 (e.g., as maintained within data repository 134). In some instances, executed incentive determination module 270 may parse the structured or unstructured data records of incentive data store 142 to identify one or more data records that include or reference customer identifier 250, and that identify and characterize corresponding ones of the targeted offers or incentives that are available for provisioning to user 101 and that are associated with one or more recommend financial products, financial services, or purchase transaction specified within recommendations data 268.

For example, the elements of recommendations data 268 may include a product identifier 268A that identifies a recommended home mortgage product of potential interest to user 101, and a product identifier 268B that identifies a recommended rewards-based credit card of potential interest to user 101. In some instances, each of product identifiers 268A and 268B may correspond to alphanumeric character string associated to corresponding ones of the home mortgage product and the rewards-based credit card (e.g., a product name, etc.). As illustrated in FIG. 2C, executed incentive determination module 270 may obtain, from incentive data store 142, one or more elements of available offer data 272 that are associated with customer identifier 250 (e.g., the alphanumeric identifier assigned by the financial institution, etc.) and that include, or reference product identifier 268A. The elements of offer data 272 may, for example, characterize a targeted, offer, by the financial institution, to provision, to user 101, a home mortgage product to user 101, and in some instances, executed incentive determination module 270 may access product database 136A of product data store 136, and obtain elements of qualification data 274 that identify one or more internal qualification or underwriting procedures that, when applied to elements of customer-specific data associated with user 101, may "pre-qualify" user 101 for the home mortgage product in accordance with a determine set of terms and conditions.

In some instances, and based on the elements of qualification data 274, executed incentive determination module 270 may perform operations that apply the one or more internal qualification or underwriting procedures to elements of customer profile data 140A, account data 140B, transaction data 140C, payroll data 140D, and third-party data 140E that include, or reference, customer identifier 250 of user 101. By way of example, the elements of third-party data 140E associated with user 101 may include elements of reporting data generated and maintained by a corresponding credit bureau or other reporting entity (e.g., third-party system 160 of FIG. 1), the elements of reporting data may characterize user 101's interactions with the financial institution associated with FI computing system 130 and with other financial institutions, and a use, or misuse, of financial products or services provisioned to user 101 by the financial institution or by the other financial institution. The elements of reporting data may include, but are not limited to, a credit score assigned to user 101 by the credit bureau or reporting entity or a number of credit inquiries associated with user 101 during one or more temporal intervals.

In some instances, and based on an application of the one or more internal qualification or underwriting procedures to elements of customer profile data 140A, account data 140B, transaction data 140C, payroll data 140D, and third-party data 140E associated with user 101, executed incentive determination module 270 may perform operations that pre-qualify user 101 for the home mortgage product in accordance with one or more terms and conditions, and subject to a submission of additional documentation and a completion of the underwriting process by the financial institution. By way of example, the one or more terms and conditions associated with the pre-qualification of user 101 for the home mortgage product may include, but are not limited to, a maximum principal amount (e.g., $175,000.00), a corresponding interest rate (e.g., a fixed, 6.23% APR), and a term of the home mortgage product (e.g., thirty years). In some instances, executed incentive determination module 270 may generate elements of term data 276, which identify the determined terms and conditions of the pre-qualified home mortgage product and the additional documentation required to complete the underwriting process, and store the generated elements of term data 276 within a corresponding portion of account data 140B, along with customer identifier 250 (not illustrated in FIG. 2C). Further, executed incentive determination module 270 may perform any of the exemplary processes described herein to obtain one or more elements of digital content 278 associated with the targeted customer-specific offer to provision the pre-qualified home mortgage product to user 101 in accordance with the determined terms and conditions (subject to the additional documentation), and with the elements of available offer data 272, from incentive data store 142. Executed incentive determination module 270 may also perform operations that package at least a portion of available offer data 272, term data 276, and the elements of digital content 278 within a corresponding portion of targeted data 280, e.g., within element 282.

As described herein, the elements of recommendations data 268 may also include product identifier 268B that identifies a recommended rewards-based credit card of potential interest to user 101. As illustrated in FIG. 2C, executed incentive determination module 270 may obtain, from incentive data store 142, one or more elements of available incentive data 284 that are associated with customer identifier 350 and that include, or reference product identifier 268B. The elements of incentive data 284 may, for example, characterize a targeted, customer-specific incentive that prompts user 101 to apply for the rewards-based credit card provisioned by the financial institution, e.g., an accrual of a predetermined number of bonus rewards points, such as 200 bonus rewards points, for each transaction initiated at merchant 111 using the rewards-based credit card and characterize by a transaction amount that exceeds a predetermined amount, such as $100.00. Executed incentive determination module 270 may obtain, from incentive data store 142, one or more elements of digital content 286 associated with the targeted customer-specific incentive to apply for the rewards-based credit card), and with the elements of available incentive data 284. Executed incentive determination module 270 may also perform operations that package at least a portion of available incentive data 284, the elements of digital content 286, and one or more elements of term data 288, that characterize the incentive (e.g., the accrual of the 200 bonus rewards points for each transaction initiated at merchant 111 using the rewards-based credit card and characterized by a transaction amount that exceeds $100.00) within a corresponding portion of targeted data 280, e.g., within element 290.

The disclosed embodiments are, however, not limited to these exemplary merchant-, transaction-, and/or product-specific offers or incentives associated with the requested real-time payment of the $6,500.00 in monthly wages to user 101 on May 30, 2022. In other instances, executed incentive determination module 270 may perform any of the exemplary processes described herein to generate elements of targeted data 280 that identify and characterize any additional, or alternate, merchant-, customer-, and/or product-specific offers or incentives that are characterized by the data records of incentive data store 142, and that are associated with user 101 and appropriate to the requested real-time payment. Executed analytical engine 148 may provision targeted data 280, including elements 282 and 290 associated with the targeted, product-specific offers and incentives, as an input to notification engine 150, which when executed by the one or more processors of FI computing system 130, may perform any of the exemplary processes described herein to generate a payment notification associated with the requested real-time payment of the $6,500.00 in monthly wages to user 101 on May 30, 2022, and to generate an incentive notification associated with one, or more, of the targeted, product-specific offers or incentives characterized by corresponding ones of the elements of targeted data 280.

Figure 3:
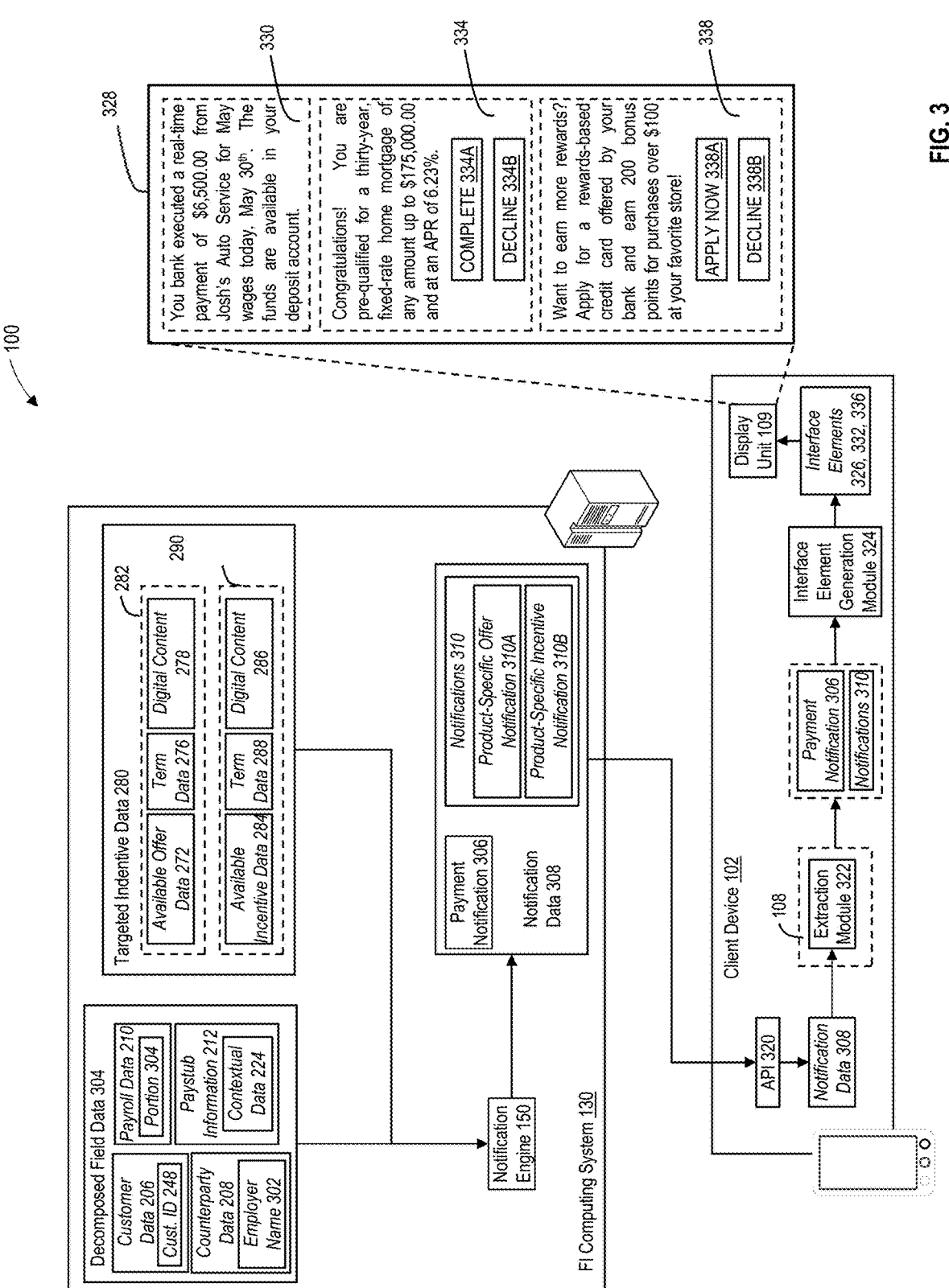

Referring to FIG. 3, executed notification engine 150 may receive the elements of targeted data 280, including elements 282 and 290 associated with respective ones of the targeted product-specific offers and incentives described herein. Executed notification engine 150 may also perform operations that access data repository 134, and obtain decomposed field data 204 that includes one or more elements of customer data 206, counterparty data 208, payroll data 210, and paystub information 212 extracted from the structured or unstructured message fields of RFP message 202 and as such, that characterize the requested real-time payment of the $6,500.00 in monthly wages to user 101 on May 30, 2022. In some instances, executed notification engine 150 may parse customer data 206 within decomposed field data 204 to obtain customer identifier 248 of user 101, such as, but not limited to, a full name of user 101 extracted from the message fields of the RFP message 202 (e.g., "John Q. Stone"). Executed notification engine 150 may also parse counterparty data 208 to obtain a name 302 of the employer of user 101 (e.g., "Josh's Auto Service"), and may also parse payroll data 210 to obtain information, among other things, the requested payment date of "May 30, 2022", requested payment of $6,500.00 in U.S. dollars, and the account number of the deposit account held by user 101 at the financial intuition and capable of receiving proceeds from the $6,500.00 payment (e.g., "XXXX-9012-3456-7890").

In some instances, not illustrated in FIG. 3, FI computing system 130 may perform operations that execute the requested real-time payment of the $6,500.00 in monthly wages to user 101 on May 30, 2022, and credit the deposit account of user 101 (e.g., having account number "XXXX-9012-3456-7890," as specified within payroll data 210) with the $6,500.00 in funds in real-time on May 30, 2022, and contemporaneously with the receipt of RFP message 202. Further, FI computing system 130 may also perform operations that generate an additional RTP message that confirms the execution of the real-time payment of the $6,500.00 in monthly wages to user 101, which the employer's financial institution of the employer's payroll provider requested on May 30, 2022, and that broadcast the additional RTP message across network 120 to one or more computing systems of the employer's financial institution of the employer's payroll provider, either directly or through a clearinghouse associated with the RTP ecosystem.

Executed notification engine 150 may perform additional operations that generate a payment notification 306 that includes the customer identifier 248, a portion 304 of payroll data 210 that specifies the $6,500.00 payment amount and a requested payment date (e.g., May 30, 2022), and employer name 302, and package payment notification 306 into a corresponding portion of notification data 308. Further, and based on the one or more elements of customer data 206, counterparty data 208, payroll data 210, and paystub information 212 (including contextual data 224), and based on the elements of targeted data 280, executed notification engine 150 may generate one or more notifications 310 that identify and characterize each of the targeted, merchant-, transaction-, and product-specific offers described herein.

For example, as illustrated in FIG. 3, notifications 310 may include a product-specific offer notification 310A associated with the targeted, customer-specific offer to provision the home mortgage to pre-qualified user 101 in accordance with the terms and conditions, and subject to the additional documentation, specified within term data 276 of element 282, and product-specific offer notification 310A may include, all, or a selected portion of element 282 of targeted data 280, such as portions of available offer data 272, term data 276, and digital content 278 described herein. Further, notifications 310 may also include a product-specific incentive notification 310B associated with the targeted, customer-specific incentive that prompts user 101 to apply for a rewards-based credit card available for provisioning by the financial institution in exchange for the accrual of the predetermined number of bonus rewards points (e.g., 200 bonus rewards points) for each transaction initiated at a particular merchant (e.g., merchant 111) using the rewards-based credit card and characterized by a transaction amount that exceeds a predetermined amount (e.g., $100.00), as specified within element 290 of targeted data 280. In some instances, product-specific incentive notification 310B may include, all, or a selected portion of element 290 of targeted data 280, such as portions of available incentive data 284, term data 288 (e.g., that identifies and characterizes the terms of the corresponding incentive), and digital content 286, as described herein.

Executed notification engine 150 may package notifications 310, including product-specific offer notification 310A and product-specific incentive notification 310B, into corresponding portions of notification data 308. In some instances, executed notification engine 150 may perform operations that cause FI computing system 130 to transmit notification data 308, including payment notification 306 and each of notifications 310, across network 120 to client device 102. A programmatic interface established and maintained by client device 102, such as application programming interface (API) 320 associated with mobile banking application 108, may receive notification data 308, and may perform operations that trigger an execution (e.g., via a programmatic command, etc.) of mobile banking application 108 by the one or more processors of client device 102, e.g., processor 104. In some instances, API 320 may route notification data 308 to an extraction module 322 of executed mobile banking application 108.

As described herein, executed extraction module 322 may receive notification data 308, which includes payment notification 306 and each of notifications 310, and may perform operations that parse payment notification 306 to obtain customer identifier 248, the employer name 302, and portion 304 of payroll data 210 that specifies the requested, and subsequently executed, real-time payment of the $6,500.00 in monthly wages on May 30, 2022, which executed extraction module 322 may provide as an input to an interface element generation module 324 of executed mobile banking application 108. In some instances, executed interface element generation module 324 may perform operations that generate one or more interface elements 326 based on customer identifier 248, employer name 302, and portion 304 of payroll data 210, and provide interface elements 326 to display unit 109A. When rendered for presentation within notification interface 328 by display unit 109A, interface elements 326 provide a graphical representation 330 of a status of the requested, and now-executed, $6,500.00 real-time payment within a single display screen or window, or across multiple display screens or windows, of notification interface 328. For example, as illustrated in FIG. 3, interface elements 326 may, when presented within notification interface 328, provide the status requested now-executed, $6,500.00 real-time payment to user 101 for wages earned from May 1, 2022, to May 31, 2022, which may confirm the availability of the $6,500.00 in funds within the deposit account of user 101.

Further, executed extraction module 322 may also perform operations that parse one or more of notifications 310, such as product-specific offer notification 310A associated with the targeted, customer-specific offer to provision the home mortgage to pre-qualified user 101 in accordance with the terms and conditions, and subject to the additional documentation. By way of example, the one or more terms and conditions associated with the pre-qualification of user 101 for the home mortgage product may include, but are not limited to, a maximum principal amount (e.g., $175,000.00), a corresponding interest rate (e.g., a fixed, 6.23% APR), and a term of the home mortgage product (e.g., thirty years), and executed extraction module 322 may, for example, obtain portions of available offer data 272 (e.g., that identifies the targeted, customer-specific offer), term data 276 (e.g., that identifies the terms and conditions, and the additional documentation, associated with the pre-qualitied home mortgage product), and the elements of digital content 278. Executed extraction module 322 may provide the extracted portions of available offer data 272, term data 276, and the elements of digital content 278 as inputs to executed interface element generation module 324, which may perform operations that generate additional interface elements 332 based on portions of available offer data 272, term data 276, and the elements of digital content 278, and that route interface elements 332 to display unit 109A.

When rendered for presentation within notification interface 328 by display unit 109A, interface elements 332 provide a graphical representation 334 of the targeted, customer-specific offer to provision the home mortgage to pre-qualified user 101 in accordance with the terms and conditions, and subject to the additional documentation, within a single display screen or window, or across multiple display screens or windows, of notification interface 328. For example, when presented within notification interface 328, graphical representation 334 may identify the available, home mortgage product and present the targeted, customer-specific offer in real-time and contemporaneously with the presentation of graphical representation 330, and prompt user 101 to accept the pre-qualification for the home mortgage product and complete the underwriting process for the home mortgage product by submitting the additional documentation or alternatively, to decline the pre-qualification for the home mortgage product, e.g., based on input provided to input unit 109B of client device 102 that selects a respective one of a "COMPLETE" icon 334A and a "DECLINE" icon 334B presented within notification interface 328.

By way of example, and upon viewing graphical representation 334, user 101 may elect to accept the pre-qualification for the home mortgage product and complete the underwriting process for the home mortgage product, and user 101 may provide input to client device 102 (e.g., via input unit 109B) that selects "CONFIRM" icon 334A presented within notification interface 328. Based on the selection of icon 334A, input unit 109B may route corresponding elements of input data indicative of the selection of "CONFIRM" icon 334A to executed mobile banking application 108, which may perform operations (not illustrated in FIG. 3C) that generate a response to product-specific offer notification 310A that includes an incentive confirmation of the acceptance of the targeted, customer-specific offer for the pre-qualified home mortgage product in accordance with the determined terms or conditions, and subject to the submission of the additional documentation and that cause FI computing system 130 to transmit the generated response across network 120 to FI computing system 130. Although not illustrated in FIG. 2C, a programmatic interface established and maintained by FI computing system 130, such as API 203, may receive the response, and may route the response to incentive determination module 270 of executed analytical engine 148, which may parse the response and confirm the acceptance of the targeted, customer-specific offer for the pre-qualified home mortgage product.

Based on the confirmation of the acceptance of the targeted, customer-specific offer by user 101, executed incentive determination module 270 may perform any of the exemplary processes described herein to complete a qualification or underwriting process (e.g., in accordance with elements of qualification data 274) and upon successful completion of the underwriting process, to provision the home mortgage product to user 101 in accordance with the determined terms and conditions (e.g., the thirty-year, fixed-rate home mortgage in the amount of $175,000.00 and at a 6.23% APR). Further, although not illustrated in FIG. 3, executed incentive determination module 270 may also perform operations that generate elements of product data that identify the provisioned, home mortgage product (e.g., a corresponding account number) and specify the terms and conditions (e.g., the $175,000.00 principal, the thirty-year term, the first 6.23% APR, etc.), and that store the generated elements of product data within a corresponding portion of account data 140B associated with user 101.

Referring back to FIG. 3, executed extraction module 322 may also perform operations that parse an additional one of notifications 310, such as product-specific incentive notification 310B associated with the targeted, customer-specific incentive that prompts user 101 to apply for the rewards-based credit card available for provisioning by the financial institution in exchange for the accrual of the predetermined number of bonus rewards points (e.g., 200 bonus rewards points) for each transaction initiated at a particular merchant (e.g., merchant 111) using the rewards-based credit card and characterized by a transaction amount that exceeds a predetermined amount (e.g., $100.00). Executed extraction module 322 may, for example, obtain portions of available incentive data 284 (e.g., that identifies the targeted, customer-specific incentive), term data 288 (e.g., that identifies the terms and conditions of the incentive, including the predetermined number of bonus points and the transaction amount that triggers the incentive), and the elements of digital content 286 from product-specific incentive notification 310B. Executed extraction module 322 may provide the extracted portions of available incentive data 284, term data 288, and the elements of digital content 286 as inputs to executed interface element generation module 324, which may perform operations that generate additional interface elements 336 based on portions of available incentive data 284, term data 288, and the elements of digital content 286, and that route interface elements 326 to display unit 109A.

When rendered for presentation within notification interface 328 by display unit 109A, interface elements 336 provide a graphical representation 338 of the targeted, customer-specific incentive to apply for the available rewards-based credit card within a single display screen or window, or across multiple display screens or windows, of notification interface 328. For example, when presented within notification interface 328, graphical representation 334 may identify the available rewards-based credit card and present the targeted, customer-specific incentive in real-time and contemporaneously with the presentation of graphical representation 330, and prompt user 101 to apply for the rewards-based credit card subject to the targeted, customer-specific incentive or alternatively, to decline to apply for the rewards-based credit card, e.g., based on input provided to input unit 109B of client device 102 that selects a respective one of an "APPLY NOW" icon 338A and a "DECLINE" icon 338B presented within notification interface 328.

By way of example, and upon viewing graphical representation 334, user 101 may elect to apply for the rewards-based credit card subject to the targeted, customer-specific incentive, and user 101 may provide input to client device 102 (e.g., via input unit 109B) that selects "APPLY NOW" icon 338A presented within notification interface 328. Based on the selection of icon 338A, input unit 109B may route corresponding elements of input data indicative of the selection of "APPLY NOW" icon 338A to executed mobile banking application 108, which may perform operations (not illustrated in FIG. 3C) that generate a response to product-specific incentive notification 310B that includes a confirmation of the acceptance of the targeted, customer-specific incentive and that client device 102 to transmit the generated response across network 120 to FI computing system 130. Although not illustrated in FIG. 3C, a programmatic interface established and maintained by FI computing system

130, such as API 203, may receive the response, and may route the response to incentive determination module 270 of executed analytical engine 148, which may parse the response and confirm the acceptance of the targeted, customer-specific incentive for the rewards-based credit card. In some instances, incentive determination module 270 may perform operations that transmit, across network 120 to client device 102, additional data that enables user 101 to complete the application for the rewards-based credit card using client device 102 or an additional computing device of system (e.g., a hyperlink to a webpage associated with the rewards-based credit card, etc.).

The disclosed embodiments are, however, not limited to processes that generate, and render for presentation within notification interface 328, graphical representations of the exemplary notifications described herein, which characterize corresponding exemplary merchant-, customer-, and/or product-specific offers or incentives associated with the recommended financial products, financial services, or purchase transactions of potential interest to user 101. In other instances, executed notification engine 150 may perform any of the exemplary processes described herein to generate further ones of notifications 310, which identify, and characterize, additional or alternate merchant-, customer-, and/or product-specific offers or incentives that are associated with additional, or alternate, the recommended financial products, financial services, or purchase transactions, and client device 102 may perform any of the exemplary processes described herein to present these notifications to user 101 in real-time and contemporaneously with the execution of the requested, $6,500.00 real-time payment to user 101 for wages on May 30, 2022.

Figure 4C:
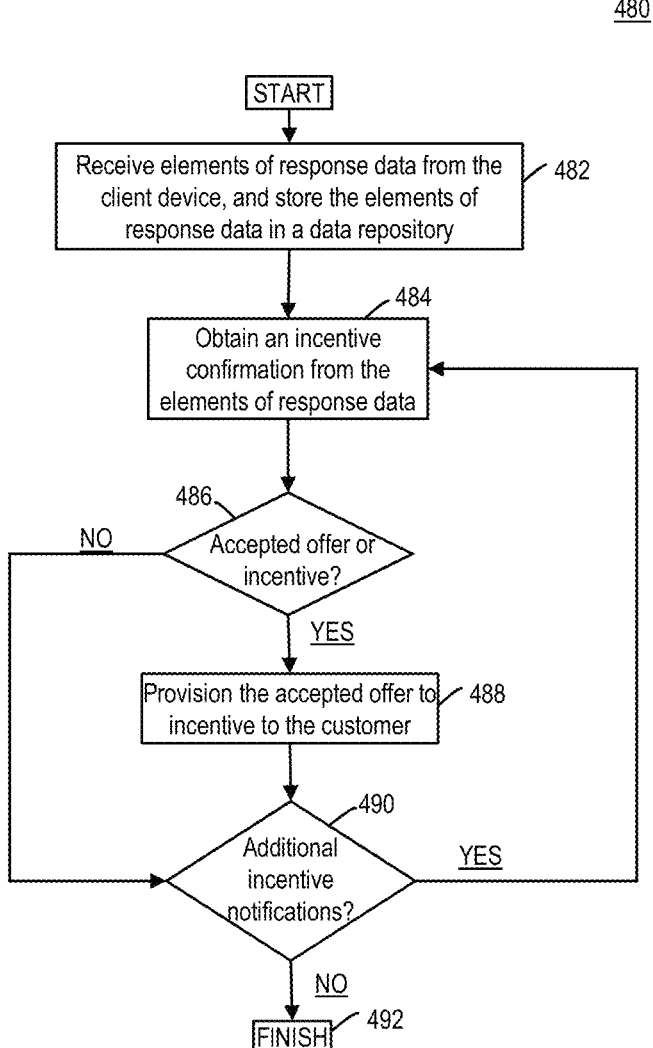

FIGS. 4A, 4B, and 4C are flowcharts of exemplary processes for provisioning targeted digital content associated with an initiated exchange of data in real-time, and contemporaneously with the initiation of the data exchange, based on a request-for-payment (RFP) message formatted and structured in accordance with one or more standardized data-exchange protocols. For example, one or more computing systems associated with a financial institution, such as FI computing system 130, may perform one or more of the steps of exemplary process 400, as described below in reference to FIG. 4A, and one or more of the steps of exemplary processor 480, as described below in reference to FIG. 4C, and a computing device associated with, or operable by, user 101, such as client device 102, may perform one or more of the steps of exemplary process 460, as described below in reference to FIG. 4B.

Referring to FIG. 4A, FI computing system 130 may perform any of the processes described herein to obtain a request-for-payment (RFP) message associated with an exchange of data initiated between a first counterparty and a second counterparty (e.g., in step 402 of FIG. 4A). As described herein, the first counterparty may correspond to an employer of a customer of a financial institution (e.g., an employer of user 101), and the second counterparty may correspond to the customer of the financial institution (e.g., user 101). In some instances, the data exchange may be associated with an occurrence of a corresponding event, such as a payroll event initiated by the employer, and may include, among other things, a real-time payment, requested by the employer, to user 101 party in an amount corresponding to wages earned by user 101 during a corresponding pay period (e.g., the $6,500.00 real-time payment to user 101, requested by the employer on May 30, 2022, for wages earned by user 101 during a pay period extending from May 1, 2022, to May 31, 2022). Further, as described herein, the RFP message may be generated by one or more computing systems of a financial institution of the employer, by one or more computing systems of a payroll provider of the employer, and in some instances, FI computing system 130 may receive the RFP message directly from the one or more computing systems of the employer's financial institution or the employer's payroll provider (e.g., network 120), or may receive the RFP message from one or more intermediate computing systems, such as, but not limited to, one or more computing systems of a clearinghouse associated with the RTP ecosystem.

As described herein, the received RFP message may include message fields consistent with the ISO 20022 standard for electronic data exchange between financial institutions, and each of the message fields may be populated with data structured and formatted in accordance with the ISO 20022 standard. By way of example, the received, ISO-20022-compliant RFP message may include, among other things: (i) message fields populated with data specifying a full name and postal address of the employer of user 101 and of user 101; (ii) message fields populated with data identifying a financial services account selected by the employer to fund the monthly payment of wages to user 101; (iii) message fields populated with data identifying a financial services account held by user 101 and available to receive proceeds from the requested, real-time payment; and (iv) message fields populated with a requested payment date (e.g., May 30, 2022) and one or more parameter values that characterize the monthly payment of wages, such as a payment amount (e.g., $6,500.00) and a corresponding currency that denominates the payment amount. Further, the ISO-20022-compliant RFP message 202 may also include one or more structured or unstructured message fields that specify additional information associated with the requested payment transaction, such as, but not limited to, a link to formatted paystub data (e.g., in PDF or HTML format), which may identify the employer or the employer's postal address, and that includes contextual data characterizing a gross pay associated with the corresponding pay period and one or more deductions from that gross pay (e.g., tax withholding, pre-tax deductions, etc.). As described herein, the link may include a long-form or shortened URL associated with formatted paystub data, e.g., that points to the storage location of formatted paystub data within a data repository maintained by one or more computing systems associated with the payroll provider.

Referring back to FIG. 4A, FI computing system 130 may store the received RFP message within a corresponding portion of locally accessible data repository, such as within RFP message queue 135 of data repository 134 (e.g., in step 404 of FIG. 4A), and may obtain, from the locally accessible data repository, one or more elements of field mapping data that characterize a structure, composition, or format of one or more data fields of the received RFP message (e.g., in step 406 of FIG. 4A). Based on the obtained elements of the field mapping data, FI computing system 130 may perform any of the exemplary processes described herein to parse the data maintained within the message fields of the received RFP message, and to obtain elements of decomposed field data that identify and characterize user 101, the employer of user 101, and the requested real-time payment to user 101 for the wages earned during the corresponding pay period (e.g., in step 408 of FIG. 4A).

For example, and as described herein, the elements of decomposed field data (e.g., decomposed field data 204 of FIGS. 2A and 2C) may include, but are not limited to, elements of customer data that identify a full name or postal address of user 101 (e.g., customer data 206 of decomposed field data 204), elements of counterparty data that identify an employer name or an address of the employer (e.g., counterparty data 208 of decomposed field data 204), elements of payroll data that identify the requested payment date, the requested payment amount and payment currency, a formatted identifier of the financial services account selected by the employer to fund the requested payment amount (e.g., an account number, etc.), and a formatted identifier of the financial services account held by user 101 and capable of receiving proceeds from the requested, real-time payment (e.g., an account number of a deposit account held by user 101 at the financial institution).

Further, and as described herein, the elements of decomposed field data may also include additional elements of structured or unstructured data, such as, but not limited to, a long-form URL or a shortened URL that point to elements of formatted paystub data (e.g., in PDF or HTML form) associated with the requested, real-time payment at one or more additional computing systems, such as the one or more computing systems of the employer's payroll provider (e.g., URL 220 of paystub information 212 of decomposed field data 204). In some instances, FI computing system 130 may perform any of the exemplary processes described herein to process the long-form URL or a shortened URL and to obtain (i) additional elements of decomposed field data that identify and characterize user 101, the employer of user 101, and the requested real-time payment to user 101 for the wages earned during the corresponding pay period, and/or (ii) elements of contextual data (e.g., contextual data 224 of paystub information 212) that further characterize user 101, the employer of user 101, and the requested, real-time payment to user 101 for the wages earned during the corresponding pay period (e.g., in step 410 of FIG. 4A). FI computing system 130 may also perform operations, described herein, that store the additional elements of decomposed field data and/or the elements of contextual data within the data repository (e.g., also in step 410 of FIG. 4A).

For example, the long-form URL may include one or more embedded elements of customer data, counterparty data, or payroll data, such as, but not limited to, the postal code of the employer of user 101 and an employee identifier assigned to user 101 by the employer. In some instances, FI computing system 130 may perform any of the exemplary processes described herein may parse the long URL to identify and extract one or more of the additional elements of decomposed field data from the long-form URL, and to store the additional elements of decomposed field within the data repository (e.g., in step 410 of FIG. 4A). Further, in some examples, FI computing system 130 may perform any of the exemplary processes described herein to process the long- or shortened URL and obtain elements of formatted paystub data maintained by one or more computing systems of the employer's payroll provider, formatted paystub data 216 maintained within provider system 214 of FIG. 2A (e.g., also in step 410 of FIG. 4A).

As described herein, the formatted data may be structured in PDF or HTML format, and FI computing system 130 may perform any of the exemplary processes described herein and may perform operations, described herein, to process the elements of formatted data (e.g., through an application of an optical character recognition (OCR) process to the formatted data structured in PDF form, or to parse code associated with, or apply a screen-scraping process to, the formatted data structured in HTML form), and obtain one or more of the additional elements of the decomposed field data and/or the elements of contextual data (e.g., also in step 410 of FIG. 4A). In some instances, and for the $6,500.00 real-time payment to user 101 requested by the employer on May 30, 2022, for the wages earned by user 101, the elements of contextual data may include, but are not limited to, an actual postal address of the employer, a corresponding pay period associated with the requested, real-time payment (e.g., a monthly pay period from May 1, 2022, to May 31, 2022), an amount of gross wages earned during the corresponding pay period, and certain deductions from that gross pay during the corresponding pay period, such as those due to government withholding, healthcare, or other pre-tax deductions.

FI computing system 130 may perform any of the exemplary processes described herein to execute the requested real-time payment to user 101 in accordance with the decomposed elements of payroll data, and that generate an additional RTP message that confirms the execution of the real-time payment to user 101 (e.g., in step 412 of FIG. 4A). FI computing system 130 may also broadcast the generated, additional RTP message that confirms the execution of the requested, real-time payment across network 120 to one or more computing systems of the employer's financial institution of the employer's payroll provider, either directly or through a clearinghouse associated with the RTP ecosystem (e.g., also in step 412 of FIG. 4A). As described herein, FI computing system 130 may perform any of the exemplary processes described herein to execute the requested, real-time payment to user 101, and to broadcast the additional RTP message, in funds in real-time on the requested payment data and contemporaneously with the receipt of RFP message 202.

In some instances, FI computing system 130 may also perform any of the exemplary processes described herein to generate elements of parameterized data that include a parameter value, or a corresponding bracket range of parameter values for one or more target demographic, account, transactional, and payroll parameters of user 101 during a current temporal interval, or across one or more prior temporal intervals (e.g., in step 414 of FIG. 4A). Further, and based on at least the elements of generated parameterized data associated with user 101, FI computing system 130 perform any of the exemplary processes described herein to identify one or more of additional customers of the financial institution (e.g., a "customer peer group") associated with values of the one or more target demographic, account, transactional, and payroll parameters that are similar to corresponding parameter values associated with user 101 (e.g., in step 416 of FIG. 4A). As described herein, a value of one of the target demographic, account, transactional, and payroll parameters that characterizes one of the additional customers may be similar to a corresponding parameter value that characterizes user 101 when the parameter value is equivalent to the corresponding parameter value, when parameter value falls within a predetermined, threshold amount of the corresponding parameter value, or when the parameter value is disposed within a specified value range that includes the corresponding parameter value. Further, in some instances, unique customer identifiers of these additional customers (e.g., a unique, alphanumeric identifier assigned by the financial institution) may establish collectively a "customer peer group" for user 101.

Further, and based on elements of customer profile, account, payroll, and third-party data associated with the additional customers of the customer peer group, FI computing system 130 may perform any of the exemplary processes described herein to generate elements of peer behavioral data that identify and characterize patterns in one or more transactional- or product-specific habits or behaviors of the additional customers of the customer peer group during a current temporal interval, or over one or more prior temporal intervals (e.g., in step 418 of FIG. 4A). By way of example, and as described herein, FI computing system 130 may generate the elements of peer behavioral data based on an application of a trained machine-learning or artificial-intelligence process, such as a clustering process, to corresponding elements of customer profile, account, payroll, and third-party data associated with the additional customers of the customer peer group.

In some examples, and based on the elements of decomposed field data associated with the requested, real-time payment to user 101, additional elements of customer profile, account, transaction, payroll, and/or third-party data associated with user 101, and based on the elements of peer behavioral data, FI computing system 130 may perform any of the exemplary processes described herein to generate elements of recommendation data that identify and characterize one or more financial products, financial services, or purchase transactions that may be of potential interest to user 101 (e.g., in step 420 of FIG. 4A). As described herein, FI computing system 130 perform operations in step 420 that generate at least a portion of the recommendations data based on an application of one or more predetermined, cluster-, product-, or transaction specific rules (e.g., maintained within corresponding portions of rubric data) to the portions of the peer behavioral data, to the elements of decomposed field data, and/or to the additional elements of customer profile, account, transaction, payroll, and/or third-party data associated with user 101. In other examples, FI computing system 130 may perform any of the exemplary processes described herein to identify one or more of the recommended financial products, financial services, or purchase transaction, and to generate at least a portion of the recommendations data, based on an application of a trained machine-learning or artificial-intelligence process to an input dataset obtained from, or extracted from, portions of the elements of the peer behavioral data, the elements of decomposed field data, and/or the additional elements of customer profile, account, transaction, payroll, and/or third-party data associated with user 101 (e.g., also in step 420 of FIG. 4A).

Based on the generated elements of recommendation data, FI computing system 130 may perform any of the exemplary processes described herein to obtain incentive data characterizing one or more targeted offers or incentives with all, or a selected portion, of the recommended financial products, financial services, or purchase transactions (e.g., in step 422 of FIG. 4A). FI computing system 130 may also perform any of the exemplary processes described herein to generate one or more elements of a payment notification associated with the queued RFP message based on all, or a selected portion, of the decomposed field data (e.g., in step 424 of FIG. 4A). By way of example, and as described herein, the payment notification may confirm the execution of the requested, real-time payment to user 101, and that payment notification may include, among other things, the full name of user 101, the requested amount and the requested payment date, the name of the employer of user 101. Further, and as illustrated in FIG. 4A, FI computing system 130 may also perform any of the exemplary processes described herein to generate one or more elements of a notification associated with each of the targeted offers or incentives (e.g., in step 426 of FIG. 4A).

By way of example, for a particular one of the targeted offers or incentives, the corresponding notification may include, but is not limited to, information that identifies and characterizes the particular targeted offer or incentive (e.g., corresponding elements of available incentive data and term data, etc.) and digital content that, when presented on a digital interface generated by an application program executed at client device 102 (e.g., mobile banking application 108 of FIG. 1, etc.), prompt user 101 to provide input to client device 102 that accepts, or alternatively, declines, the particular targeted offer or incentive in real-time and contemporaneously within the receipt of the corresponding RFP message and the execution of the corresponding, requested, real-time payment. FI computing system 130 may also perform any of the exemplary processes described herein to package the generated payment notification and the one or more incentive notification into corresponding portions of notification data, and to transmit the elements of notification data across network 120 to client device 102 (e.g., in step 428 of FIG. 4A). Exemplary process 400 is then complete in step 430.

Referring to FIG. 4B, client device 102 may perform any of the exemplary processes described herein to receive the elements of notification data from FI computing system 130, and store the elements of notification data within a portion of a tangible, non-transitory memory accessible to client device 102 (e.g., in step 462 of FIG. 4B). Client device 102 may also perform any of the exemplary processes described herein to obtain the payment notification from the received elements of notification data, and generate, and render for presentation within a corresponding digital interface, a graphical representation of the payment notification, which confirms the execution of the requested, real-time payment to user 101 and the available corresponding wages within the specified deposit account of user 101 (e.g., in step 464 of FIG. 4B).

Client device 102 may also perform any of the exemplary processes described herein to obtain one of the offer or incentive notifications included within the received elements of notification data, and generate, and render for presentation within a corresponding digital interface, a graphical representation of the obtained offer or incentive notification that prompts user 101 to accept, or alternatively, reject, the corresponding one of the targeted offers or incentives (e.g., in step 466 of FIG. 4B). Further, client device 102 may receive, via input unit 109B, elements of user input indicative of an acceptance, or a rejection, of the corresponding one of the targeted offers or incentives (e.g., in step 468 of FIG. 4B), and client device 102 may perform any of the exemplary processes described herein to process the elements of input data and generate an incentive confirmation indicative of the acceptance, or rejection, of the corresponding one of the targeted offers or incentives (e.g., in step 470 of FIG. 4B).

Client device 102 may also perform operations that parse the received notification data and determine whether the notification data includes additional offer or incentive notifications awaiting presentation (e.g., in step 472 of FIG. 4B). If, for example, client device 102 were to determine that the notification data includes additional offer or incentive notifications awaiting processing (e.g., step 472; YES), exemplary process 460 may pass back to step 436, and client device 102 may perform any of the exemplary processes described herein to obtain an additional one of the offer or incentive notifications from the received elements of notification data, and generate, and render for presentation within the corresponding digital interface, a graphical representation of the obtained additional offer or incentive notification.

Alternatively, if client device 102 were to determine that the notification data includes no further incentive notifications (e.g., step 472; NO), client device 102 may also perform any of the exemplary processes described herein to generate elements of response data that include offer or incentive confirmations, and to transmit the elements of response data across network 120 to FI computing system 130 (e.g., in step 474 of FIG. 4B). Exemplary process 460 is then complete in step 476.

Referring to FIG. 4C, FI computing system 130 may receive the elements of response data from client device 102, and may store the received elements of response data within one or more tangible, non-transitory memories accessible to FI computing system 130, such as in conjunction with the elements of decomposed field data within data repository 134 (e.g., in step 482 of FIG. 4C). FI computing system 130 may also perform operations, described herein, that obtain, from the elements of response data, one of the incentive confirmation indicative of the approval, or alternatively, the rejection, of a corresponding one of the targeted offers or incentives by user 101 (e.g., in step 484 of FIG. 4C), and that process the obtained incentive confirmation and determine whether user 101 approved, or rejected, the corresponding one of the targeted offers or incentives (e.g., in step 486 of FIG. 4C). If FI computing system 130 were to determine that user 101 accepted the corresponding one of the targeted offers or incentives (e.g., step 486; YES), FI computing system 130 may perform any of the exemplary processes described to provision the corresponding one of the targeted offers or incentives to user 101 (e.g., in step 488 of FIG. 4C).

FI computing system 130 may also perform operations that parse the received response data and determine whether the response data includes additional offer or incentive confirmations awaiting processing (e.g., in step 490 of FIG. 4C). If, for example, FI computing system were to determine that the response data includes additional incentive confirmation awaiting provisioning (e.g., step 490; YES), exemplary process 400 may pass back to step 484, FI computing system 130 may also perform operations that obtain, from the elements of response data, an additional one of the offer or incentive confirmations indicative of the approval, or alternatively, the rejection, of an additional one of the targeted offers or incentives by user 101. Alternatively, if FI computing system were to determine that the response data includes no additional incentive confirmations (e.g., step 490; NO), exemplary process 400 may be complete in step 492.

Referring back to step 434, If FI computing system 130 were to determine that user 101 rejected the corresponding one of the targeted offers or incentives (e.g., step 486; NO), exemplary process 400 may pass to step 484, and FI computing system 130 may perform operations that parse the received response data and determine whether the response data includes additional incentive confirmation awaiting provisioning.

C. Exemplary Computing Architectures

Embodiments of the subject matter and the functional operations described in this disclosure can be implemented in digital electronic circuitry, in tangibly-embodied computer software or firmware, in computer hardware, including the structures disclosed in this specification and their structural equivalents, or in combinations of one or more of them.

Embodiments of the subject matter described in this disclosure, including application programming interfaces (APIs) 203 and 320, decomposition engine 146, analytical engine 148, notification engine 150, paystub analysis engine 222, parameterization module 246, grouping module 256, peer behavior analysis module 260, recommendations module 266, incentive determination module 270, extraction module 322, and interface element generation module 324, can be implemented as one or more computer programs, i.e., one or more modules of computer program instructions encoded on a tangible non-transitory program carrier for execution by, or to control the operation of, a data processing apparatus (or a computing system). Additionally, or alternatively, the program instructions can be encoded on an artificially-generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them The terms "apparatus," "device," and "system" refer to data processing hardware and encompass all kinds of apparatus, devices, and machines for processing data, including by way of example a programmable processor, a computer, or multiple processors or computers. The apparatus, device, or system can also be or further include special purpose logic circuitry, such as an FPGA (field programmable gate array) or an ASIC (application-specific integrated circuit). The apparatus, device, or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random-access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) or an assisted Global Positioning System (AGPS) receiver, or a portable storage device, such as a universal serial bus (USB) flash drive, to name just a few.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, such as user 101, embodiments of the subject matter described in this specification can be implemented on a computer having a display device, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a client computer having a graphical user interface or a Web browser through which a user can interact with an implementation of the subject matter described in this specification, or any combination of one or more such back-end, middleware, or front-end components. The components of the system can be interconnected by any form or medium of digital data communication, such as a communication network. Examples of communication networks include a local area network (LAN) and a wide area network (WAN), such as the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification includes many specifics, these should not be construed as limitations on the scope of the disclosure or of what may be claimed, but rather as descriptions of features specific to particular embodiments of the disclosure. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, unless otherwise specifically defined herein, all terms are to be given their broadest possible interpretation including meanings implied from the specification as well as meanings understood by those skilled in the art and/or as defined in dictionaries, treatises, etc. It is also noted that, as used in the specification and the appended claims, the singular forms "a," "an," and "the" include plural referents unless otherwise specified, and the terms "comprises" and/or "comprising," when used in this specification, specify the presence or addition of one or more other features, aspects, steps, operations, elements, components, and/or groups thereof. Moreover, the terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship. In this disclosure, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only and are not to be construed as limiting the described subject matter.

The foregoing is provided for purposes of illustrating, explaining, and describing embodiments of this disclosure. Modifications and adaptations to the embodiments will be apparent to those skilled in the art and may be made without departing from the scope or spirit of the disclosure.

What is claimed is:

1. An apparatus comprising:

a communications interface communicatively coupled to a network;

a memory storing instructions; and at least one processor coupled to the communications interface and to the memory, the at least one processor being configured to execute the instructions to:

receive, via the communications interface across the network, a message associated with an exchange of data initiated between devices operable by a first counterparty and a receive, via the communications interface and across the network, second counterparty, the message being structured in accordance with a standardized data-exchange protocol, the message comprising elements of message data disposed within corresponding message fields, and the elements of message data comprising values of parameters that characterize the initiated data exchange;

based on mapping data associated with the standardized data-exchange protocol, perform operations that decompose the message fields of the message and extract the parameter values from corresponding ones of the elements of message data;

based on one or more of the extracted parameter values, determine a range of first geographic locations associated with the device operable by the first counterparty, and perform operations that identify one or more peer counterparties associated with corresponding second geographic locations, the second geographic locations associated with prior exchanges of data involving additional devices operable by corresponding ones of the peer counterparties;

based on a determination that each of the second geographic locations is disposed within the range of the first geographic locations, generate peer data that includes an identifier of each of the one or more peer counterparties and the corresponding second geographic locations, and generate, based on corresponding portions of the peer data, behavioral data that characterizes one or more clusters of the peer counterparties associated with corresponding values of at least one cluster parameter during a temporal interval;

generate elements of recommendation data associated with the first counterparty based on (i) the behavioral data characterizing a behavior of the one or more peer counterparties during the temporal interval or (ii) at least one of the parameter values that characterize the first counterparty or the data exchange, and obtain at least one element of digital content associated with the elements of recommendation data; and transmit, via the communications interface and across the network, notification data to the device operable by the first counterparty, the notification data being transmitted to the device in real-time upon receipt of the message, the notification data comprising at least a portion of the recommendation data and the at least one element of digital content, and the notification data causing an application program executed at the device to present the portion of the recommendation data and the at least one element of the digital content within a digital interface.

2. The apparatus of claim 1, wherein the at least one processor is further configured to execute the instructions to:

obtain, from the memory, the mapping data associated with the message fields of the message;

perform operations that obtain the elements of message data from corresponding ones of the message fields based on the mapping data; and store the elements of message data within the memory, the elements of message data comprising a first identifier of the first counterparty, a second identifier of the second counterparty, and the parameter values characterizing the data exchange.

3. The apparatus of claim 2, wherein:

elements of the mapping data identify corresponding ones of the elements of the message data and corresponding ones of the message fields.

4. The apparatus of claim 2, wherein the at least one processor is further configured to execute the instructions to obtain, based on the mapping data, information associated with the data exchange from one or more of the message fields, the information comprising a uniform resource locator associated with elements of formatted data maintained by a computing system.

5. The apparatus of claim 4, wherein the at least one processor is further configured to execute the instructions to, based on the uniform resource locator, perform operations that request and receive one or more of the elements of formatted data from the computing system via the communications interface.

6. The apparatus of claim 5, wherein the at least one processor is further configured to execute the instructions to process the one or more elements of formatted data, and obtain at least one of (i) an additional parameter value characterizing the data exchange from the processed elements of formatted data or (ii) one or more elements of contextual data that characterize the data exchange based on the processed elements of formatted data.

7. The apparatus of claim 2, wherein:

the at least one processor is further configured to execute the instructions to perform operations that execute the initiated data exchange in accordance with the parameter values; and the notification data further comprises additional digital content associated with the executed data exchange, and the notification data further causes the executed application program to present elements of the digital content and the additional digital content within a portion of the digital interface.

8. The apparatus of claim 1, wherein the at least one processor is further configured to execute the instructions to identify the at least one element of the digital content associated with the elements of recommendation data.

9. The apparatus of claim 1, wherein the at least one processor is further configured to:

based on one or more of the elements of message data, determine a value of at least one parameter that characterizes the first counterparty;

apply a trained machine-learning or artificial intelligence process to an input dataset comprising one or more of the elements of behavioral data and at least one of the parameter values that characterize the first counterparty; and based on the application of the trained machine-learning or artificial-intelligence process to the input dataset, generate at least a subset of the elements of recommendation data associated with the first counterparty.

10. The apparatus of claim 1, wherein the at last one processor is further configured to generate the elements of behavioral data based on elements of interaction data characterizing each of the one or more peer counterparties.

11. The apparatus of claim 1, wherein:

the digital content is associated with at least one of a product or service available to the first counterparty; and wherein the at least one processor is further configured to execute the instructions to:

receive, via the communications interface, a response to the notification data from the device;

based on the response, perform operations that provision the at least one product or service to the first counterparty; and store data associated with the at least one provisioned product or service within the memory.

12. A computer-implemented method, comprising:

receiving, using at least one processor, a message associated with an exchange of data initiated between devices operable by a first counterparty and a second counterparty, the message comprising elements of message data disposed within corresponding message, and the elements of message data comprising values of parameters that characterize the first counterparty or the data exchange;

based on mapping data associated with the standardized data-exchange protocol, performing operations, using the at least one processor, that decompose the message fields of the message and extract the parameter values from corresponding ones of the elements of message data;

using the at least one processor, and based on one or more of the extracted parameter values, determining a range of first geographic locations associated with the device operable by the first counterparty, and performing operations that identify one or more peer counterparties associated with corresponding second geographic locations, the second geographic locations being associated with prior exchanges of data involving additional devices operable by corresponding ones of the peer counterparties;

based on a determination that each of the second geographic locations is disposed within the range of the first geographic locations, generating, using the at least one processor, peer data that includes an identifier of each of the one or more peer counterparties and the corresponding second geographic locations, and generating, using the at least one processor, and based on corresponding portions of the peer data, behavioral data characterizing one or more clusters of the peer counter parties associated with corresponding values of at least one cluster parameter during a temporal interval;

using the at least one processor, generating elements of recommendation data associated with the first counterparty based on (i) the behavioral data or (ii) at least one of the parameter values that characterize the first counterparty or the data exchange, and obtain at least one element of digital content associated with the recommendation data; and transmitting notification data to the device operable by the first counterparty using the at least one processor, the notification data being transmitted to the device in real-time upon receipt of the message, the notification data comprising at least a portion of the recommendation data and the at least one element of digital content, and the notification data causing an application program executed at the device to present the portion of the recommendation data and the at least one element of the digital content within a digital interface.

13. The computer-implemented method of claim 12, further comprising:

obtaining, using the at least one processor, the mapping data associated with the message fields of the message from a data repository;

performing operations, using the at least one processor, that extract obtain the elements of message data from corresponding ones of the message fields based on the mapping data; and storing the elements of message data within the data repository using the at least one processor, the elements of message data comprising a first identifier of the first counterparty, a second identifier of the second counterparty, and the parameter values characterizing the data exchange.

14. The computer-implemented method of claim 13, further comprising:

based on the mapping data, obtaining, using the at least one processor, a uniform resource locator from one or more of the message fields, the uniform resource locator being associated with elements of formatted data maintained by a computing system;

based on the uniform resource locator, performing operations, using the at least one processor, that request and receive one or more of the elements of formatted data from the computing system; and using the at least one processor, processing the one or more elements of formatted data, and obtaining at least one of (i) an additional parameter value characterizing the data exchange from the processed elements of formatted data or (ii) one or more elements of contextual data that characterize the data exchange based on the processed elements of formatted data.

15. The computer-implemented method of claim 13, wherein:

the computer-implemented method further comprises performing operations, using the at least one processor, that execute the initiated data exchange in accordance with the parameter value; and the notification data further comprises additional digital content associated with the executed data exchange, and the notification data further causes the executed application program to present elements of the digital content and the additional digital content within a portion of the digital interface.

16. The computer-implemented method of claim 12, further comprising:

using the at least one processor, identifying the at least one element of the digital content associated with the elements of recommendation data.

17. The computer-implemented method of claim 12, wherein generating the elements of recommendation data comprises:

based on one or more of the elements of message data, determining a value of at least one parameter that characterizes the first counterparty;

applying a trained machine-learning or artificial intelligence process to an input dataset comprising one or more of the elements of behavioral data and at least one of the parameter values that characterize the first counterparty; and based on the application of the trained machine-learning or artificial-intelligence process to the input dataset, generating at least a subset of the elements of recommendation data associated with the first counterparty.

18. The computer-implemented method of claim 12, wherein:

the digital content is associated with at least one of a product or service available to the first counterparty; and the computer-implemented method further comprises:

receiving, using the at least one processor, a response to the notification data from the device;

based on the response, performing operations, using the at least one processor, that provision the at least one product or service to the first counterparty; and storing, using the at least one processor, data associated with the at least one provisioned product or service within a data repository.

19. A tangible, non-transitory computer-readable medium storing instructions that, when executed by at least one processor, cause the at least one processor to perform a method, comprising:

receiving a message associated with an exchange of data initiated between devices operable by a first counterparty and a second counterparty, the message being structured in accordance with a standardized data-exchange protocol, the message comprising elements of message data disposed within corresponding message fields, and the elements of message data comprising values of parameters that characterize the first counterparty or the data exchange;

based on mapping data associated with the standardized data-exchange protocol, performing operations that decompose the message fields of the message and extract the parameter values from corresponding ones of the elements of message data;

based on one or more of the extracted parameter values, determining a range of first geographic locations associated with the device operable by the first counterparty, and performing operations that identify one or more peer counterparties associated with corresponding second geographic locations, the second geographic locations being associated with prior exchanges of data involving additional devices operable by corresponding ones of the peer counterparties;

based on a determination that each of the second geographic locations is disposed within the range of the first geographic locations, generating peer data that includes an identifier of each of the one or more peer counterparties and the corresponding second geographic locations, and generating, based on corresponding portions of the peer data, behavioral data characterizing one or more clusters of the peer counterparties associated with corresponding values of at least one cluster parameter during a temporal interval;

generating elements of recommendation data associated with the first counterparty based on (i) the behavioral data or (ii) at least one of the parameter values that characterize the first counterparty or the data exchange, and obtain at least one element of digital content associated with the elements of recommendation data; and transmitting notification data to the device operable by the first counterparty, the notification data being transmitted to the device in real-time upon receipt of the message, the notification data comprising at least a portion of the recommendation data and the at least one element of digital content, and the notification data causing an application program executed at the device to present the portion of the recommendation data and the at least one element digital content within a digital interface.

20. The apparatus of claim 1, wherein the at least one processor is further configured to execute the instructions to:

determine a range of first values of at least one parameter that characterizes the first counterparty, and determine that a corresponding second value of the at least one parameter that characterizes each of one or more peer counterparties is disposed within the range of first values;

based on the determination that each of the corresponding second values is disposed within the range of first values, generate the peer data that includes the identifier of each of the one or more peer counterparties and the corresponding second values; and generate elements of the behavioral data associated with the clusters of the peer counterparties based on corresponding portions of the peer data.

21. The apparatus of claim 1, wherein:

the range of first geographic locations is associated with at least one of the device operable by the first counterparty or prior exchanges of data involving the device operable by the first counterparty;

each of the second geographic locations is associated with at least one of the additional device operable by a corresponding one of the peer counterparties or prior exchanges of data involving the additional device operable by the corresponding one of the peer counterparties; and the at least one processor is further configured to execute the instructions to generate the peer data based on the determination that each of the second geographic locations is disposed within the range of the first geographic locations, the peer data comprising each of the identifiers of the one or more peer counterparties and corresponding ones of the second geographic locations.

22. The apparatus of claim 1, wherein the at least one processor is further configured to execute the instructions to:

receive the message across a first communications channel via the communications interface, the first communications channel being established between the apparatus and a computing system associated with the second counterparty;

transmit, via the communications interface, the notification data to the device across a second communications channel, the second communications channel being established between the apparatus and the application program executed by the device.

23. The apparatus of claim 1, wherein the at least one processor is further configured to execute the instructions to receive a response to the notification data from the device via the communications interface and to perform operations that provision the product to the first counterparty based on the response, the response being received and the product being provisioned within a temporal interval subsequent to the receipt of the message.

24. The apparatus of claim 1, wherein the at least one processor is further configured to:

based on the peer data, obtain from the memory, elements of interaction data associated with the identifier of each of the peer counterparties;

apply a trained clustering process to an input dataset that includes the identifier of each of the peer counterparties and corresponding elements of the interaction data; and based on the application of the trained clustering process to the input dataset, generate the behavioral data characterizing the one or more clusters of the peer counterparties.

\* \* \* \* \*